(12) United States Patent
Moughton et al.

(10) Patent No.: US 12,336,654 B2
(45) Date of Patent: Jun. 24, 2025

(54) LIQUID HEATING APPLIANCES

(71) Applicants: Strix Limited, Isle of Man (GB); Strix Guangzhou Limited, Guangzhou (CN)

(72) Inventors: Colin Peter Moughton, Port St Mary (GB); Stephen John Donlon, Derbyhaven (GB); Christopher Kay, Douglas (GB); Jacob Alexander John Hewins, Santon (GB)

(73) Assignee: Strix (China) Limited, Guangzhou (CN)

( * ) Notice: Subject to any disclaimer, the term of this patent is extended or adjusted under 35 U.S.C. 154(b) by 111 days.

(21) Appl. No.: 18/015,404

(22) PCT Filed: Jul. 9, 2021

(86) PCT No.: PCT/GB2021/051764
§ 371 (c)(1),
(2) Date: Jan. 10, 2023

(87) PCT Pub. No.: WO2022/008928
PCT Pub. Date: Jan. 13, 2022

(65) Prior Publication Data
US 2023/0255389 A1  Aug. 17, 2023

(30) Foreign Application Priority Data
Jul. 10, 2020 (GB) .................................... 2010684

(51) Int. Cl.
*A47J 27/21* (2006.01)
(52) U.S. Cl.
CPC ..... *A47J 27/21166* (2013.01); *A47J 27/2105* (2013.01); *A47J 2203/00* (2013.01)

(58) Field of Classification Search
CPC .............. A47J 27/2105; A47J 27/21166; A47J 2203/00
See application file for complete search history.

(56) References Cited

U.S. PATENT DOCUMENTS

| 2011/0033176 A1 | 2/2011 | Garvey |
| 2011/0058798 A1 | 3/2011 | Garvey |
| 2023/0248173 A1* | 8/2023 | Torchio ............... A47J 31/4403 99/283 |

FOREIGN PATENT DOCUMENTS

| CN | 207604799 U | 7/2018 |
| CN | 207604809 U | 7/2018 |

(Continued)

*Primary Examiner* — Donnell A Long
(74) *Attorney, Agent, or Firm* — Getz Balich LLC

(57) ABSTRACT

A liquid heating appliance including a reservoir including a first and second chambers and a heating arrangement is provided. A mode valve is arranged to selectively allow liquid to flow between the first and second chambers. The appliance operates in a first mode in which the mode valve is closed and only liquid in the first chamber is heated and a second mode in which the mode valve is open and liquid in the first and second chambers is heated. A dispense outlet is moveable between a dispensing position and a non-dispensing position. The dispense outlet is mechanically coupled to the mode valve such that when the dispense outlet is moved into the dispense position, the mechanical coupling closes the mode valve and when the dispense outlet is moved into the non-dispensing position, the mechanical coupling opens the valve.

21 Claims, 15 Drawing Sheets

(56) References Cited

FOREIGN PATENT DOCUMENTS

| | | |
|---|---|---|
| EP | 1980181 A2 | 10/2008 |
| GB | 2466839 A | 2/2009 |
| GB | 2470894 A | 12/2010 |
| GB | 2582623 B | 8/2022 |
| WO | 2008139173 A2 | 11/2008 |
| WO | 2010094945 A2 | 8/2010 |
| WO | 2015161540 A1 | 10/2015 |

* cited by examiner

LIQUID HEATING APPLIANCES

This application is entitled to the benefit of, and incorporates by reference essential subject matter disclosed in PCT Application No. PCT/GB2021/051764 filed on Jul. 9, 2021, which claims priority to GB Patent Appln. No. 2010684.5 filed Jul. 10, 2020, which are hereby incorporated by reference in their entireties.

BACKGROUND OF THE INVENTION

1. Technical Field

The present application relates to liquid heating appliances, in particular to a liquid heating appliance capable of selectively heating a small volume of liquid.

2. Background Information

Liquid heating appliances, such as kettles, are common in many households. Kettles can be used to heat volumes, often up to 1.7l, of water, to boiling. However, users frequently only need to heat a relatively small volume of water, for example if they are making a single hot drink. Depending on the specific kettle being used, it can be difficult to accurately fill the kettle with the correct amount of water for a single drink, and as a result kettles are regularly over filled. This overfilling results in more energy being required to heat the volume of water to the desired temperature. As kettles typically have a fixed power output, this ultimately results in a user having to wait a longer period of time for the water to reach the desired temperature. Further, not only does it mean a user has to wait a longer time, the extra energy required to heat the surplus volume of water is often wasted as the surplus water is typically left to cool inside the kettle. Kettles are commonly used multiple times a day, by millions of people worldwide, and as a result, the amount of energy wasted in heating unused volumes of water is significant.

SUMMARY OF THE INVENTION

The present invention aims to provide an improved appliance and when viewed from a first aspect the present invention provides a liquid heating appliance comprising: a liquid reservoir comprising a first chamber arranged below a second chamber and separated by a partition extending therebetween, a heating arrangement arranged to heat, in use, liquid contained within the first chamber; a mode valve arranged in the partition to selectively allow liquid to flow between the first and second chambers, wherein the appliance is arranged to be operable in a first mode in which the mode valve is closed and only liquid in the first chamber is heated and a second mode in which the mode valve is open and liquid in the first and second chambers is heated by the heating arrangement; a dispense outlet arranged on an exterior wall of the appliance and moveable between a dispensing position in which it is in fluid communication with the first chamber so as to allow liquid to be dispensed from the first chamber during the first mode, and a non-dispensing position in which liquid cannot be dispensed and wherein the dispense outlet is mechanically coupled to the mode valve such that when the dispense outlet is moved into the dispensing position, the mechanical coupling closes the mode valve and when the dispense outlet is moved into the non-dispensing position, the mechanical coupling opens the mode valve.

The liquid heating appliance may thus be operated in two different modes. It may be operated in a first mode, with the mode valve closed, in which it is used to dispense a fixed volume of liquid directly from the first chamber out through the dispense outlet, i.e. a 'hot-cup' mode. In this mode, the appliance may quickly heat a smaller volume of liquid when required. The appliance may also operate in a second mode with the mode valve open. This second mode, with the mode valve in the open position, may be considered to correspond to a 'kettle' mode, as all of the water in the appliance will be heated. In this second mode, with the dispense outlet in the non-dispensing position, liquid cannot be dispensed from the dispense outlet. Instead, liquid may be poured from the appliance, e.g. through a spout. A user may select the type of operation, by controlling the position of the mode valve, depending on the volume of heated liquid they require. The ability to selectively heat a smaller volume of liquid may reduce the amount of energy wasted in heating unused volumes of water.

Through the coupling of the dispense outlet to the mode valve the operational mode of the appliance can be controlled by the relative position of the dispense outlet. This may provide a convenient means for controlling the operation of the appliance. Additionally, use of the dispense outlet for controlling operation may be a particularly intuitive means for controlling operation of the appliance. Further, the position of the dispense outlet may provide an indication to the user which mode the appliance is configured to operate in. For example, with the dispense outlet in the dispensing position, a user can easily determine that the appliance is configured to operate in the first mode. The mechanical coupling may, for example, comprise a mechanical linkage.

The dispensing position may, for example, correspond to the dispense outlet protruding out from the appliance and the non-dispensing position may correspond to the dispense outlet being retracted away into the appliance. The dispense outlet may thus be arranged to selectively protrude, slide, pivot or rotate from the dispensing to the non-dispensing position and vice-versa. The dispense outlet may be arranged at any suitable position on the appliance. For example, the dispense outlet may be arranged in a side wall of the appliance. This may conveniently allow the user to easily dispense from the appliance, for example into a receptacle such as a cup or mug. The dispense outlet may be resiliently biased towards the dispensing and/or the non-dispensing position. Resiliently biasing the dispense outlet may help to ensure that the dispense outlet is held in its respective position even if the appliance is moved. For example, when operating in the second, i.e. kettle, mode, the appliance may be lifted and tilted. Resiliently biasing the dispense outlet may help to ensure that the dispense outlet is held in the non-dispensing position when the appliance is lifted and tilted. Further, resiliently biasing the dispense outlet into either or both of the positions may help to ensure that the dispense outlet fully reaches its intended position as it is moved. Resiliently biasing the dispense outlet into the dispensing position may allow the dispense outlet to be moved into the dispensing position more easily.

With the mode valve closed, in the first, i.e. hot-cup, mode of operation, when the heating arrangement is operated, it will cause the temperature of the liquid in the first chamber to increase. As the liquid within the first chamber cannot escape its temperature will continue to rise. As the temperature increases, and eventually reaches boiling, the pressure within the first chamber will increase. This pressure may be used as a means to force the liquid out of the first chamber towards the dispense outlet. Of course additional or alternative means for dispensing may be provided, for example a pump arranged to draw the heated water from the first chamber.

With the mode valve open, i.e. with the appliance operating in the second mode, when the heating arrangement is operated, e.g. supplied with electrical power, liquid in the first chamber will be heated and convection currents will develop. The convection currents will result in heated liquid flowing out of the first chamber into the second chamber, thereby heating the liquid within the second chamber, whilst cooler liquid from the second chamber flows into the first chamber to be heated therein. After a sufficient time, the entire volume of liquid within the liquid reservoir will reach boiling.

Despite the mode valve being open in the second mode, thereby allowing fluid to flow between the first and second chambers, depending on the pressures generated in the appliance as the liquid is heated, heated liquid may in some circumstances be forced towards the dispense outlet. Therefore, in a set of embodiments, the appliance further comprises a fluid flow path arranged between the first chamber and dispense outlet, wherein the flow path comprises a dispense valve configured to have at least an open configuration in which liquid can pass through the dispense valve and a closed configuration in which liquid is inhibited from flowing through the dispense valve, and wherein the dispense outlet is coupled to the dispense valve such that when in the dispensing position, the dispense valve has the open configuration, and when in the non-dispensing position, the dispense valve has the closed configuration.

Such a dispense valve may serve to prevent the unwanted flow of liquid out of the dispense outlet when the appliance is operating in the second mode. This may be particularly important as without such a dispense valve, hot liquid may otherwise be able to escape via the dispense outlet, potentially causing injury. The coupling of the dispense outlet to the dispense valve and being such that the dispense valve has a closed configuration when the dispense outlet is in the non-dispensing position, serves to ensure that the dispense valve is closed whenever the dispense outlet is in the non-dispensing position, i.e. when the appliance is in the second mode. This coupling removes the need for the user to independently operate the dispense valve.

The dispense valve may be any valve suitable for inhibiting, i.e. preventing, the flow of liquid out through the dispense outlet. It need not necessarily completely close off the flow path, as long as it stops the flow of liquid therethrough. The dispense valve and dispense outlet may be coupled via any suitable means. For example, the dispense outlet may be mechanically coupled to the dispense valve. Alternatively, the dispense outlet may be electrically coupled to the dispense valve. For example, when in the non-dispensing position, the dispense valve may operate an electrical switch configured to operate an electrically controlled valve.

In a set of embodiments, the dispense valve comprises a length of deformable conduit in the flow path and is configured such that in the closed position the conduit is deformed to prevent the flow of liquid therethrough. Such a deformable conduit may provide a simple, reliable means for the dispensing valve. The deformable conduit may be caused to deform directly by the dispense outlet. For example, the conduit may be attached at one end to a body of the appliance and at second end to the dispense outlet. Movement of the dispense outlet from the dispensing position to the non-dispensing position may cause deformation, e.g. bending, of the deformable conduit such that liquid can no longer flow therethrough. The dispense outlet may comprise any suitable means for achieving such deformation. For example, deformation may be achieved through folding of the conduit. Such folding may be caused due to the mounting of the conduit and the movement of the dispense outlet. In addition, or alternatively, the dispense outlet may be arranged to physically press against the conduit so as to cause deformation. The dispense outlet may, for example, comprise a protrusion configured to act on the conduit as the dispense outlet moves into the non-dispensing position.

The way in which the conduit deforms may at least partially define whether liquid can pass through the conduit. Control over how the conduit deforms may thus be important in ensuring that the conduit functions to effectively stop the flow of liquid therethough. Accordingly, in a set of embodiments the conduit comprises a region having a reduced wall thickness. The reduced thickness wall section may reliably cause the conduit to deform in a predictable manner which stops the flow of liquid through the conduit. This may therefore ensure that the dispense valve reliably acts to stop the flow of liquid.

In another potentially overlapping set of embodiments, the conduit comprises at least a first portion having a first cross-section and a second portion having a second, different, cross section. Similarly to the reduced thickness wall section, the differing cross-sections may be used to more reliably control where and how the conduit deforms. For example, the conduit may comprise a first portion having a circular cross section and a second section having an elliptic, or rounded rectangular cross section. In the case of an elliptic cross section, the ellipse may, for example, have a major axis which matches the diameter of the circular cross section, but a minor axis which is less than the diameter of the circular cross section. Any suitable combination of cross sections may be used which suitably control how the conduit deforms. In embodiments which have both a reduced wall thickness, and portions having different cross-sections, the reduced wall thickness section may be aligned with the second, different, cross section. This combination may thus allow even further control over how the conduit deforms.

The deformable conduit may be made from any suitable material that is capable of being repeatedly deformed a large number of times. In a set of embodiments, the conduit is formed from silicone. The silicone may be cured. Silicone may be particularly suitable due to its resilience to deformation. In other words, the silicone tube may be deformed, and allowed to return to its original shape, a large number of times thus making it suitable for use in a domestic appliance in which the mode of operation may be changed a large number of times during the lifetime of the appliance.

When operating in the first mode, as described above, liquid may be ejected out of the first chamber under steam pressure. The dispensing of liquid from the first chamber may, in some instances be turbulent as the steam pressure builds in the first chamber. Accordingly, in a set of embodiments the appliance further comprises a dispense chamber arranged in a fluid flow path between the first chamber and the dispense outlet, such that liquid first passes via the dispense chamber before passing out of the dispense outlet. The dispensing chamber provides a space for the heated liquid and steam to separate such that the heated liquid can be dispensed in a more controlled manner from the dispense outlet, with substantially less steam being dispensed with the heated liquid. This may provide for a more controlled laminar dispensing of the liquid which may be safer for a user. The dispensing chamber may, for example, comprise a weir, over which the liquid must pass before it can reach the dispense outlet. Such a weir may act to ensure that any cold liquid not dispensed in a previous operation, is mixed with freshly heated liquid, prior to dispensing thereby ensuring that the dispensed liquid is hot. The weir may also act to ensure that the heated liquid and steam which reach the dispense chamber have the opportunity to properly separate, before the heated liquid can dispense, thereby reducing the amount of steam which is dispensed out of the dispense outlet.

In embodiments comprising a dispense chamber as well as a dispense valve, the dispense valve may be arranged upstream or downstream of the dispense chamber, with regard to the flow of heated liquid travelling towards the dispense outlet. In a set of embodiments, the dispense valve is located downstream of the dispense chamber. This may advantageously mean that the dispense valve also prevents the outflow of any liquid which leaks from the dispense chamber, when the appliance is in the second mode of operation. For example, the dispense chamber may house a small amount of liquid not dispensed during a previous hot-cup operation which, without the dispense valve, may otherwise leak out of the dispense outlet.

The dispense chamber may be arranged within the second chamber, preferably in an upper portion thereof. In a set of embodiments, the dispense chamber comprises a liquid inlet, in communication with the first chamber, a first liquid outlet in communication with the dispense outlet, and a second liquid outlet in liquid communication with the second chamber to allow undispensed liquid to drain back into the second chamber. In a further set of embodiments, the dispense chamber comprises a valve element arranged to selectively close the first or second liquid outlet. Such a valve element may allow the selective closing of the first liquid outlet, thereby stopping the flow of liquid towards the dispense outlet, and also allow the selective opening and closing of the second liquid outlet, to control whether liquid is free to drain back into the second chamber. Such a valve element may, for example, be coupled to a 'STOP' button which a user may operate to stop a dispensing operation in the hot-cup mode.

The fluid flow path between the first chamber and second chamber, e.g. a fluid flow path connecting an outlet on the first chamber to the liquid inlet on the dispense chamber, may be open in both the first and second modes of operation. As a result, despite the mode valve being open between the first and second chamber, some heated water may be driven towards the dispense chamber. Whilst this may ultimately be stopped from escaping via the dispense outlet, e.g. through the presence of a dispense valve in certain embodiments, it may nonetheless be desirable to prevent heated liquid from reaching the dispense chamber when operating in the second mode to further prevent the unwanted outflow of liquid from the dispense outlet.

In a set of embodiments, the appliance further comprises a fluid connection conduit connecting the first chamber to the dispense chamber, and wherein the connection conduit follows a tortuous path. The tortuous path may increase the length of the flow path and therefore provide a resistance to the flow of fluid towards the dispense chamber. When operating in the second mode, i.e. the kettle mode, the overall pressure in the appliance will typically be less, and thus this resistance to flow may be sufficient to prevent heated liquid from passing up through the connection conduit. This may therefore minimize the ability for water to escape via the dispense outlet when operating in the second mode. As will be appreciated by those skilled in the art, when operating in the first mode, i.e. the hot-cup mode, the pressure in the first chamber will be sufficient to force the heated liquid through the connection conduit, despite the tortuous path. The appliance can therefore operate in an optimal manner in both modes.

In a set of embodiments, the tortuous path comprises at least first and second bends arranged to define an s-bend. The first and second bends which define an s-bend may define a trap which may further help to prevent the flow of liquid from the first chamber towards the dispense chamber, when operating in the second mode. A further advantage of such an arrangement is that an outlet on the first chamber, to which the connecting conduit is connected to, and the inlet on the dispense chamber, to which the other end of the connecting conduit is connected to, need not necessarily be aligned with one another as the bends may account for any lateral offset of the outlet and inlet. This may permit more design freedom within the appliance thereby allowing the outlet in the first chamber and the inlet in the dispense chamber to be situated in the most appropriate position, without necessarily being constrained by the connecting conduit extending therebetween. The use of an s-bend is also advantageous as it takes up minimal space within the appliance whilst still providing an effective resistance to the flow of liquid therein.

In a set of embodiments, the liquid heating appliance has an intended maximum fill level, and wherein at least one bend in the tortuous flow path is arranged above the maximum fill level. The at least one bend may, for example, correspond to the first bend of the s-bend. For example, the apex of the at least one bend may be arranged above the maximum fill level.

In order to generally prevent leaking of liquid out of the appliance, various seals may be arranged between different components of the appliance. In a set of embodiments, the mechanical coupling comprises a mechanical linkage which extends through an opening in a wall which at least partially defines the second chamber, wherein the appliance further comprises a sealing member extending around the mechanical linkage, wherein a first portion of the sealing member is sealed around the opening and second portion of the sealing member is sealed to the mechanical linkage, and wherein the sealing member is configured such that the second portion of the sealing member can be moved relative to the first portion of the sealing member.

The sealing member may thus act to seal the opening thereby preventing liquid from leaking out of the appliance via the opening. Further, this specific seal arrangement may also advantageously allow the mechanical linkage to move relatively freely within the opening, without necessarily compromising the integrity of the seal. For example, with the arrangement described above, the mechanical linkage may not rub against the sealing member at all as it is moved by the dispensing outlet. Accordingly, wearing of the sealing member may be reduced. Further, unlike other possible sealing arrangements, such as an O-ring seal which the mechanical linkage would pass through and be in close contact with, movement of the mechanical linkage according to this embodiment may not be resisted by the sealing member. Due to the second portion being able to move relative to the first portion, the mechanical linkage may be moved more freely with respect to the opening. This may help to ensure that the force required to move the dispense outlet is kept as small as possible, thus ensuring that the appliance is easy to operate.

Additionally, use of the sealing member described allows for more design freedom in the way in which the mechanical linkage links the dispense outlet and the mode valve. For example, the sealing member may allow the mechanical linkage to move laterally, as well as moving vertically. This may thus allow improved action of the mechanical linkage allowing it to act more effectively.

The first portion and second portions of the valve member may correspond to first and second ends of the valve member, respectively. Movement of the second portion of the valve member relative to the first portion may be achieved by any suitable means. For example, the sealing member between the first portion and second portion may be elastic, so as to permit movement of the second portion relative to the first portion, which is fixed around the opening. In a set of embodiments, the sealing member comprises a bellowed structure configured to permit movement of the second portion relative to the first portion. A bellowed arrangement may conveniently permit movement in multiple different directions whilst also providing minimum resistance to such movement. Such a bellowed structure may also increase the life span of the sealing member as it does not necessarily need to stretch which may otherwise cause stresses in the material of the sealing member. The bellowed structure may have any number of bellows of any suitable relative dimension.

The sealing member may be attached around the opening and to the mechanical linkage via any suitable means. In a set of embodiments, the mechanical linkage comprises a slot into which the second portion of the sealing member engages. A slot in the mechanical linkage may provide a convenient means for securing the sealing member to the mechanical linkage during assembly of the appliance. The slot may also help to ensure that the sealing member remains securely fastened to the mechanical linkage, thus ensuring it maintains its ability to effectively seal the opening even as the mechanical linkage is moved through its range of motion. The sealing member may be made of any suitable material, for example silicone.

When the appliance is operating in the first mode, i.e. the hot-cup mode, as discussed above, the appliance may utilize an increase in pressure in the first chamber to drive heated liquid out of the first chamber towards the dispense outlet. However, such an increase in pressure may, depending on the particular form of the mode valve, also act to apply a force tending to open the mode valve. As will be appreciated, if the mode valve were to open during operation in the first mode, the pressure in the first chamber may drop and the heated liquid may not be forced towards the dispense outlet. Therefore, in a set of embodiments, the appliance further comprises a latch arrangement configured to hold the mode valve in the closed position. The latch arrangement may thus act to hold the mode valve in the closed position, and thus resist any opening force applied by the increase in pressure. This may advantageously facilitate the presence of a mode valve which allows a larger flow of water between the first and second chambers in the second mode of operation, i.e. a mode valve with a larger opening, which would otherwise not be possible due to the valve being opened too easily when operating in the first mode. This increased ability to circulate liquid when operating in the second mode may improve the operation of the appliance in the second mode allowing it to heat the liquid contained therein in a more efficient manner. Holding the mode valve closed will also ensure that the appliance can operate most efficiently in the first mode of operation, without the risk of the mode valve undesirably releasing pressure from the first chamber into the second chamber.

The latching arrangement may, for example, comprises a resiliently biased latching member. The latching member may, for example, be displaced out of a latching position, as the mode valve is moved into its closed position, and be biased back into the latching position once the mode valve reaches its fully closed position.

In order to move the mode valve into the open position, the latch arrangement may need to be released. In a set of embodiments, the latch arrangement is configured to be released by movement of the dispense outlet from the dispensing position to the non-dispensing position. Such an arrangement may provide a convenient means for releasing the latch arrangement in a single action by the user when changing the appliance mode by the dispensing outlet. The release may be achieved through applying a sufficiently large force to the dispense outlet, and the mode valve may cause the latching arrangement to be released. In a set of embodiments, however, the latch arrangement is configured to be released by the mechanical coupling. Through appropriate design of the mechanical coupling, e.g. the mechanical linkage, and the way it interacts with the latching mechanism, it may be possible to release the latching mechanism with minimal force applied to the dispense outlet. The latching arrangement may be released through operating of release members which act to release a latch within the latching arrangement.

Whilst a single latch arrangement has been described above, any number of latches may be included. For example, the latch arrangement may latch the mode valve at multiple positions to ensure it remains in the closed position.

The mode valve itself may be any suitable valve for controlling the flow of fluid between the first and second chambers. The mode valve need not necessarily be a single valve, and instead may comprise a plurality of valves. In a set of embodiments, the mode valve comprises a flap valve. Such a flap valve may provide a valve which can be easily implemented within the space constraints of a liquid heating appliance. Additionally, a flap valve may be particularly suitable for operation by a mechanical linkage and may thus simplify the internal structure of the appliance thus minimizing the cost of manufacture. In a set of embodiments, the flap valve comprises a valve member pivoted at a pivot point and arranged to mate with a respective valve seat in the partition to thereby close the flap valve and prevent the flow of liquid therethrough.

In a set of embodiments, the valve member is a ring shaped valve member and has a u-shaped cross section. The use of a ring-shaped valve member may allow a further valve, e.g. a float valve, to be arranged in the center of the partition, i.e. in the space defined by the ring shaped valve member. The partition may have a conical profile, and the further valve may be arranged at a peak (e.g. at the center) of the partition. This may advantageously cause any air within the first chamber to collect at the peak of the partition and escape through the further valve. The u-shaped cross section of the valve member may help to increase the rigidity of the valve member.

In another set of embodiments, at least one portion of a wall of the ring-shaped valve member has an increased height when compared to other portions of the valve member. The height of the wall may determine the rigidity of the valve member. Therefore, by providing certain sections with an increased height, it may be possible to increase the rigidity of the valve member in regions where it is needed, without unnecessarily increasing the rigidity where it is not needed. This may result in a saving on the amount of material required to manufacture a suitable valve member. In addition, or alternatively, sections of the valve member may have walls having an increased thickness. This may also act to increase the rigidity of the valve member. Sections of increased rigidity may be positioned where the valve member is least supported, for example at sections most distant from a pivot point, or the latch where provided. For example, sections having increased rigidity, e.g. through increased wall height, or through increased wall thickness, may be arranged near the central portion of the valve seat, in-between the pivot point and latch point where provided.

In a set of embodiments, the ring shaped valve member comprises a plurality of support fins arranged to increase the rigidity of the ring shaped valve member. The support fins may also increase the rigidity of the valve member so as to ensure that it can seal the flap valve in an appropriate manner.

In a set of embodiments, the heating arrangement arranged to heat liquid in the first chamber is the only heating arrangement in the liquid heating appliance. Due to the mode valve which allows the flow of liquid between the first and second chambers when the mode valve is in the open position, the appliance advantageously may only need a single heating arrangement to heat the contents of the appliance in both operational modes. This may help to minimize the cost of the appliance.

The liquid heating appliance may comprise any suitable means for dispensing liquid from the appliance in the second mode of operation, i.e. the kettle mode. In a set of embodiments, the liquid reservoir comprises a spout arranged to allow liquid to be poured out of the appliance and the mode valve is arranged in the partition substantially below the spout. A spout may provide a convenient means for allowing dispensing of the liquid from within the appliance, which a user may already be well accustomed to.

The liquid heating appliance may comprise any suitable arrangement for stopping operation of the heating arrangement, e.g. switching off the power supply, when the temperature of the liquid within either of the first or second chambers reaches a desired temperature. For example, the liquid heating appliance may comprise an electronic controller connected to a thermistor sensitive to the temperature of the liquid in one or both of the first and second chambers. When the electronic controller detects a certain state has been reached, e.g. when boiling has been reached, the electronic controller may shut off the electrical power supply to the heating element in order to terminate heating. In a set of embodiments, the appliance further comprises a thermomechanical element arranged so as to be sensitive to temperature within the appliance, and arranged to switch off a power supply to the heating arrangement when the thermomechanical element detects a predefined temperature. A thermomechanical arrangement may provide a simple and inexpensive means for controlling operation of the appliance. The predefined temperature may, for example, correspond to a typical minimum temperature of steam.

A separate thermomechanical element may be provided for sensing the temperature of liquid heated in each of the first and second chambers, however, in a set of embodiments the thermomechanical element is arranged so as to be used for both the first and second chambers. This may be achieved through suitable positioning of the thermomechanical element such that it is sensitive to the temperature of liquid heated in both the first and second chambers. For example, the thermomechanical element may be arranged in an upper portion of the second chamber, and proximal to the dispense chamber, where provided. The dispense chamber, where provided, may comprise an opening through which steam can escape the dispensing chamber, so as to trigger the thermomechanical element. The thermomechanical element may form part of a thermomechanical switching means. The thermomechanical element may comprise a bimetallic sensor.

The liquid heating appliance may comprise a heating arrangement positioned within the first heating chamber, e.g. in the form of an immersed heating element, to directly heat the liquid contained therein. In a set of embodiments, however, the appliance comprises an underfloor heating arrangement arranged to heat the base of the first chamber. In a further set of embodiments, the liquid heating appliance comprises a sheathed electrical heating element.

The mode valve, described in detail above, may not be the only valve in the partition between the two chambers. For example, the partition may also comprise a float valve. Such a float valve may comprise a floating valve member arranged to float and mate with a respective valve seat and thereby close the valve in order to prevent the flow of liquid through the valve. Such a float valve may allow the first chamber to refill, following the dispensing of liquid therein in the first mode, without having to reopen the mode valve. Accordingly, the appliance may be repeatedly operated in the first mode without requiring the user to operate a valve, thereby simplifying operation for the user.

The size of the appliance, specifically the volume of the first and second chambers, may be dependent on the particular intended use of the appliance. In a set of embodiments, the first chamber has a volume between 50 ml and 500 ml, e.g. 350 ml. Such a volume may correspond to a dispensed volume suitable, for example, for a receptacle such as a mug. This therefore allows a user to heat just enough water for a single mug of heated liquid. As previously discussed, this both speeds up the heating process, and reduces the amount of wasted energy. Providing a first chamber with a volume of for example 350 ml may allow 250 ml of heated liquid to be dispensed when operating in the hot-cup mode. The amount dispensed from the first chamber in the hot-cup mode may be variable and this may be controlled in a number of ways, for example it may be achieved by blocking the flow of liquid after a certain volume has been dispensed or by a variable height weir arrangement.

The liquid heating appliance may be of the corded type, i.e. one which a power cord is either integrally provided with, or which can be directly plugged into the appliance. In a set of embodiments, however, the liquid heating appliance is a cordless heating appliance. In a further set of embodiments, the liquid reservoir is arranged to mate with a corresponding power base. The liquid reservoir may comprise a cordless electrical adaptor, and the power base may comprise a corresponding cordless electrical connector. The cordless electrical adaptor and corresponding cordless electrical connector on the base may be of the type which allows the liquid reservoir to be placed on the power base substantially irrespective of their relative angular orientation.

The liquid heating appliance may be used to heat any appropriate liquid, e.g. water.

BRIEF DESCRIPTION OF THE DRAWINGS

Some preferred embodiments of the present invention will now be described, by way of example only, and with reference to the accompanying drawings, in which.

DETAILED DESCRIPTION

Figure 1:
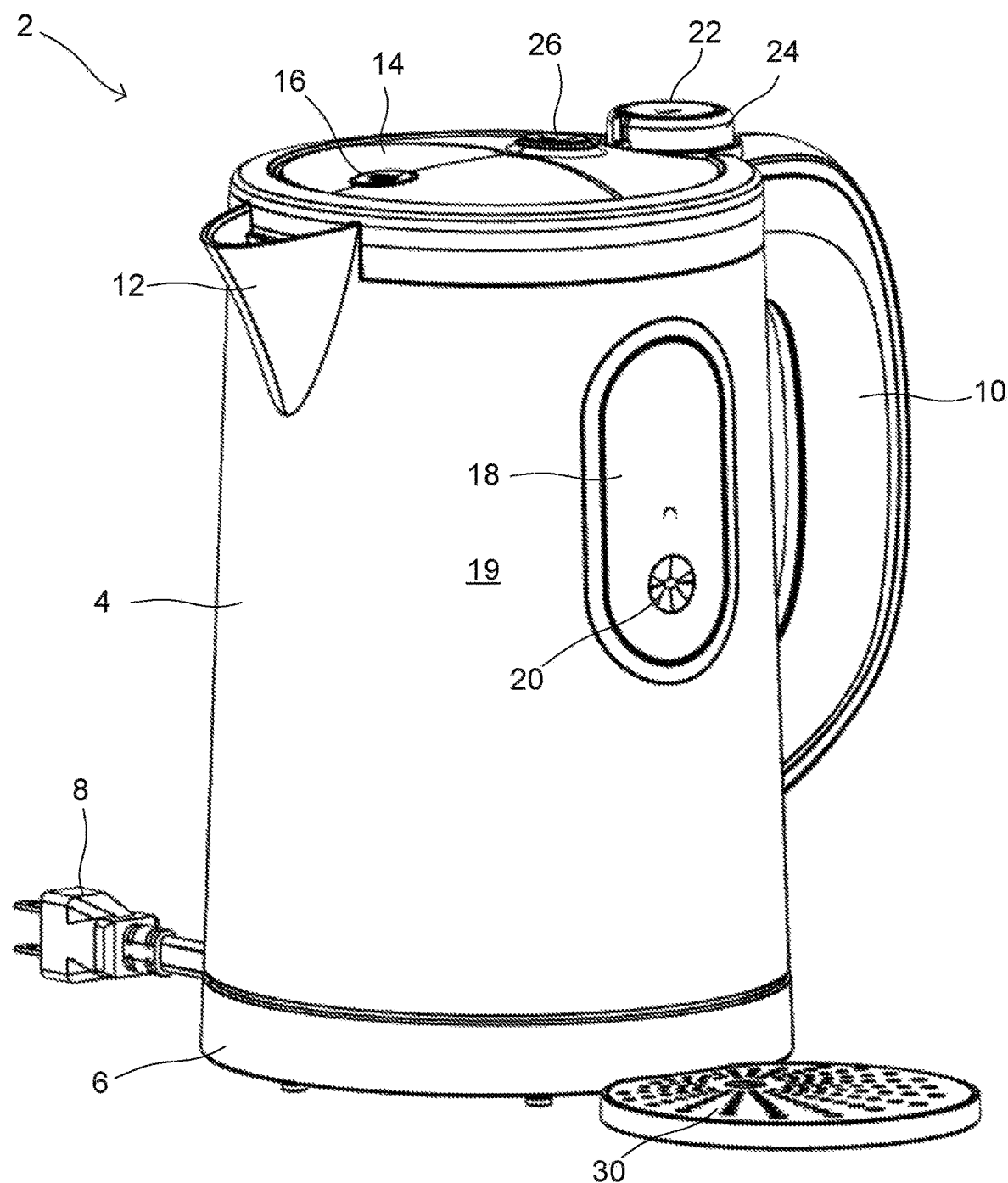
FIG. 1 shows a perspective view of a liquid heating appliance operating in a second mode in accordance with an embodiment of the invention.

FIGS. 1-11 show a liquid heating appliance, or components thereof, in accordance with an embodiment of the invention. In these views the liquid heating appliance is operating in the second mode, i.e. the kettle mode. FIG. 1 shows a perspective view of the liquid heating appliance 2, hereinafter the appliance 2. The appliance 2 comprises a liquid reservoir 4 arranged to rest on a power base 6. The liquid reservoir 4 and power base 6 may each comprise a mating part of a cordless connector arrangement, for example a 360 degree connector, which permits placement of the liquid reservoir 4 on the power base 6 at a range of different relative angular positions. The power base 6 is supplied with power by a power supply cord 8 which may be plugged into a suitable power source. Whilst the appliance 2 shown in the Figures is of the cordless type, this is not essential and the appliance may instead be of the corded type.

The liquid reservoir 4 comprises a handle 10 for lifting the appliance 2, e.g. for lifting the appliance 2 for filling or for dispensing liquid therefrom. A spout 12 is arranged on an upper forward portion of the liquid reservoir 4. An openable lid 14 is arranged at the top of the liquid reservoir 4. The lid 14 may be held in a closed position, as shown, via suitable engagement means, and may further comprise a release button 16 for releasing engagement of the lid 14, to enable filling of the liquid reservoir 4. The lid 14 may be resiliently biased, such that when the release button 16 is operated, the lid 14 automatically moves upwards to reveal an opening for filling the liquid reservoir 4.

The appliance 2 further comprises a dispense outlet 18 arranged on a side wall 19 of the liquid reservoir 4. The dispense outlet 18 is pivotably mounted within the side wall 19, as will be shown more clearly in later figures. In the configuration shown in FIG. 1, the dispense outlet is in a non-dispensing position, which corresponds to the second mode of operation. The dispense outlet 18 comprises a recessed portion 20 for a user to press when pushing the dispense outlet 18 into the non-dispensing position shown.

An "ON" button 22 is arranged on the top of the appliance 2 for turning on the appliance 2. When the dispense outlet 18 is in the non-dispensing position as shown, pressing of the "ON" button 22, will cause the appliance 2 to begin to heat the liquid contained therein in the kettle mode. An adjustment dial 24 is provided for adjusting the volume of liquid dispensed in the first mode of operation, i.e. the hot-cup mode. Adjustment of the volume of liquid dispensed in the hot cup mode may be achieved via any suitable means. For example, the dispense chamber, described in more detail below, may comprise an arrangement which allows at least a portion of the liquid therein to drain back into the second chamber. The adjustment dial 24 may control the amount of liquid allowed to drain back into the second chamber thereby controlling the amount of liquid dispensed out through the dispense outlet in the hot-cup mode.

A "STOP" button 26 is also arranged on the top of the appliance 2 and may be used to turn off the power supply to a heating arrangement within the appliance 2 and thereby stop the heating of the liquid therein. This may be used, for example, if the user decides that they no longer wish to heat the liquid.

The appliance 2 further comprises a drip tray 30, arranged underneath the dispense outlet 18. When operating in the first mode, i.e. the hot-cup mode, as will be described with reference to later Figures, the drip tray 30 may serve to collect any overspill from a receptacle which is filled from the dispense outlet 18.

Figure 2:
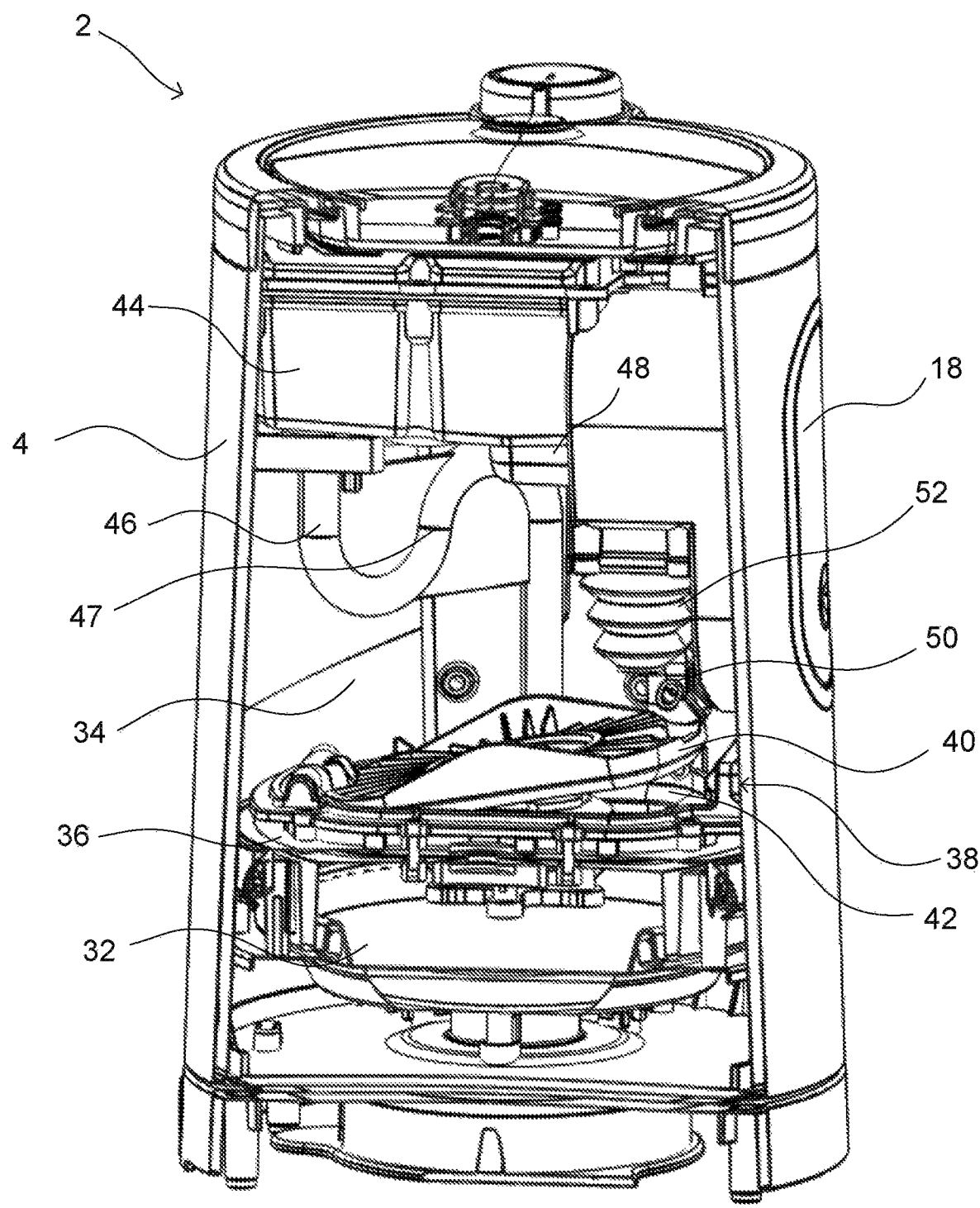
FIG. 2 is a cut-away view of the appliance shown in FIG. 1.

FIG. 2 shows a partially cutaway view into the appliance 2. As shown in this Figure, the liquid reservoir 4 comprises a first chamber 32, arranged below a second chamber 34, and separated by a partition 36. Whilst not noticeable in this Figure, the partition 36 may have a conical shape, i.e. a concave shape when viewed from the first chamber, with its peak located in the center of the partition 36. Arranged in the partition 36 is a mode valve 38, in the form of a flap valve. The mode valve 38 comprises a pivotably mounted valve member 40 which is arranged to pivot into and out of contact with a valve seat 42 which defines an opening (not visible in this figure) through the partition 36. Whilst a flap valve is shown in the Figures, any suitable valve may be used.

A dispense chamber 44 is arranged at the top of the second chamber 34 and is connected to the first chamber by a fluid flow path in the form of an s-shaped connection conduit 46. This connection conduit 46 will be described in more detail later with reference to FIG. 10. The dispense chamber 44 is connected to the dispense outlet 18 via a conduit 48. The appliance 2 may have an intended maximum fill level which is aligned with the line 47 on the connection conduit 46. The maximum fill level may be indicated through at least one marking on the inside of the liquid reservoir 4 and/or on the outside of the appliance. As shown, at least one bend of the connecting conduit 46 may be arranged above the maximum fill level 47.

The dispense outlet 18 is mechanically coupled to the valve member 40. In the embodiments depicted this mechanical coupling is achieved by a mechanical linkage 50 which is coupled to the dispense outlet 18 and the valve member 40. The dispense outlet 18 is therefore coupled to the valve member 40 such that movement of the dispense outlet 18 causes movement of the valve member 40, thus determining the state of the mode valve 38. Whilst a mechanical linkage 50 is depicted, any suitable mechanical coupling may be used. For example, the dispense outlet 18 may be coupled to the valve member 40 using a number of connecting wires which may be suitable for pulling the valve member 40 into and out of its open and closed positions. A sealing member 52, having a bellowed structure, is sealed to an opening through which the mechanical linkage 50 extends through, and also around the mechanical linkage 50 itself. This will be shown more clearly in later Figures.

Figure 3:
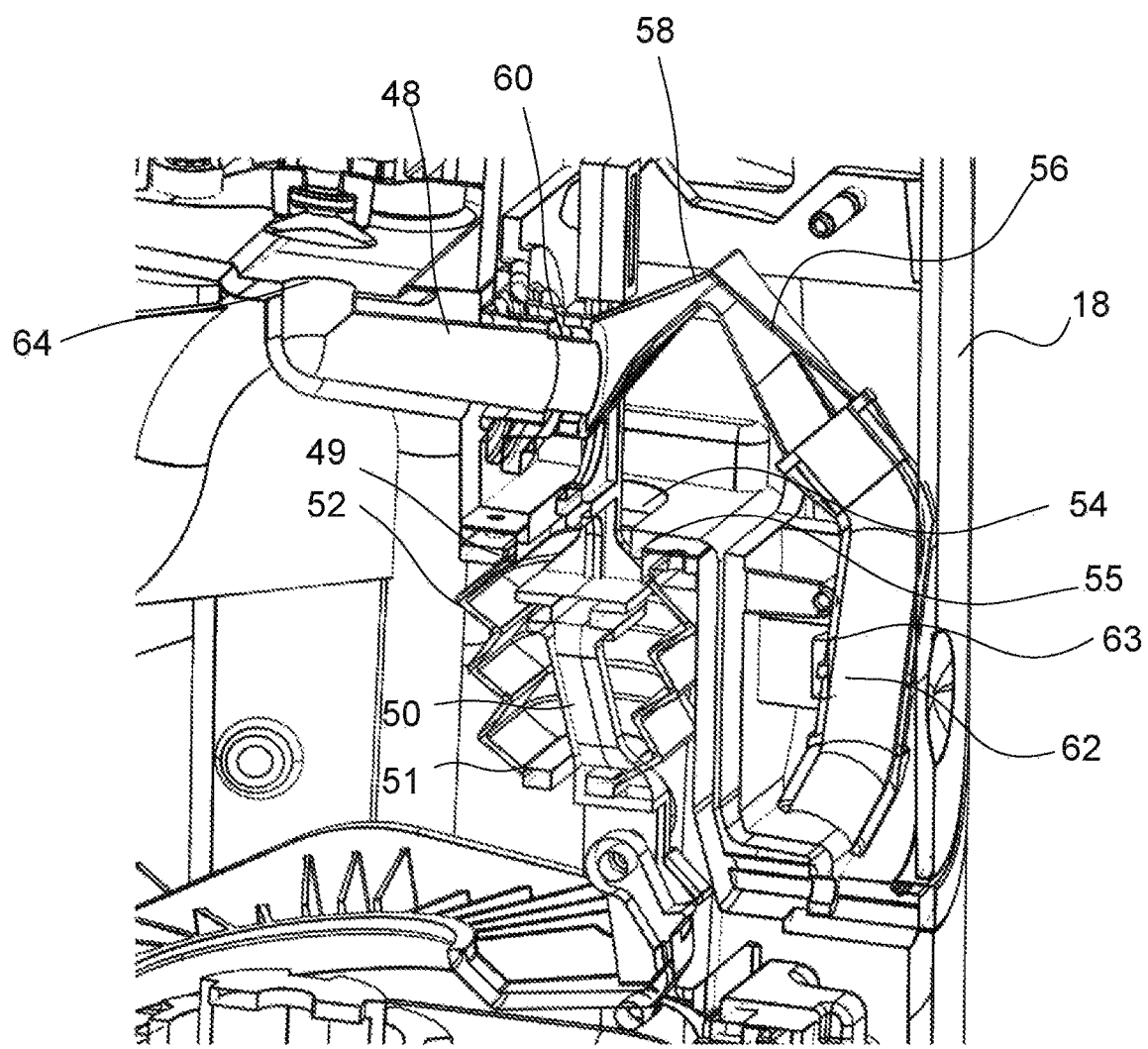
FIG. 3 is a cut-away view of the appliance shown in FIG. 1, focusing on the dispense outlet.

FIG. 3 shows a sectional view focusing on the components around the dispense outlet 18. As shown in this Figure, the sealing member 52 extends around the mechanical linkage 50. A first portion, i.e. a first end 49, of the sealing member 52 is sealed around an opening 54 in a wall 55 which at least partially defines the second chamber 34. The wall 55 also partially defines the recess in the appliance 2 into which the dispense outlet 18 is arranged. As shown in FIG. 3, the mechanical linkage 50 extends through the opening 54 which is larger than the extent of the mechanical linkage 50. The larger opening 54 therefore allows the mechanical linkage 50 to move freely within the opening both vertically and laterally, thereby allowing the mechanical linkage to move in the most suitable manner for controlling the valve member 40. A second portion, i.e. a second end of the sealing member 52 is sealed around the mechanical linkage 50. The bellowed structure of the sealing member 52 allows the second end 51 to move relatively freely with respect to the first, fixed end 49, thereby allowing the mechanical linkage 50 to move relatively freely whilst sealing the opening 54.

A fluid flow path is arranged between the first chamber 32 and the dispense outlet 18. In the embodiment depicted, this fluid flow path is via the connecting conduit 46 (shown in FIG. 2), into the dispense chamber 44, out the dispense chamber though an opening 64 into the conduit 48. A dispense valve 56 is connected at one end 60 to the conduit 48 and connected at a second end 62 to an attachment means 63 on the dispense outlet 18 itself. In the embodiment shown the dispense valve 56 is in the form of a deformable conduit. The dispense valve 56 is shown in FIG. 3 in the closed position. In the closed position, dispense valve 56 is deformed to form a kink 58 such that in this closed configuration, liquid is inhibited from flowing through the dispense valve 56. The dispense valve 56 may be formed from any suitable deformable material, for example silicone. The dispense valve 56 forms part of the dispense outlet 18, and when in the open position, liquid will be able to be dispensed out of the dispense outlet 18 through the second end 62 of the dispense valve 56.

The dispense valve 56 may be driven into this closed configuration, shown in FIG. 3, through movement of the dispense outlet 18 into the non-dispensing position depicted. As a result of the mounting of the dispense valve 56 described above, as the dispense outlet 18 is pivoted into the appliance as shown, due to the mounting points of the dispense valve 56, it will be caused to deform and form the kink 58. Accordingly, when the dispense outlet 18 is moved into the closed position, the dispense valve 56 adopts a closed configuration in which liquid flow therethrough is inhibited. As discussed previously, the linking of the dispense valve 56 to the dispense outlet 18 advantageously ensures that the dispense valve 56 is closed whenever the dispense outlet 18 is in the non-dispensing position.

The closed configuration shown in FIG. 3, need not necessarily completely close off the dispense valve 56, instead it may simply correspond to a deformed state in which the flow of liquid is inhibited. There may, for example, still be a small opening, but liquid may nonetheless be prevented from flowing therethrough due to, for example, the particular shape of the kinked section 58.

The dispense outlet 18, or indeed a part of the appliance, may comprise additional means for causing the deforming of the dispense valve 56. For example, a protrusion may be arranged on the dispense outlet 18, or on the housing into which the dispense outlet 18 retracts into, which acts on the dispense valve 56 to cause the deformation. Such a protrusion may help to ensure that the dispense valve 56 properly forms its closed configuration.

Whilst a dispense valve 56 in the form of a deformable conduit has been shown and described above, any suitable dispense valve may be utilized. For example, the dispense valve may comprise an arrangement in which a hole on an upstream part of the valve is aligned with a hole on a downstream part valve, when the dispense outlet is in a dispensing position. This alignment may allow the flow of liquid through the dispense valve. The hole on the upstream part and the hole on the downstream part may be misaligned, e.g. fully misaligned, when the dispense outlet is in a non-dispensing position. This misalignment may prevent the flow of liquid through the dispense valve. The downstream part may, for example, be pivoted, relative to the upstream part of the valve.

Figure 4:
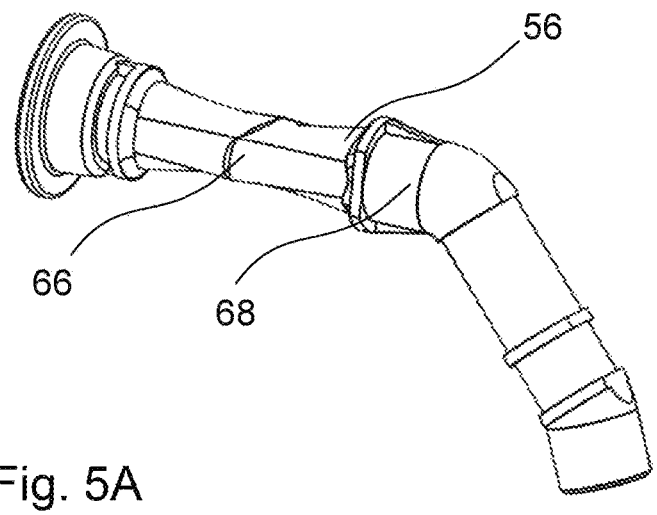
FIG. 4 is a perspective view of the dispense valve in isolation.
Figure 5A:
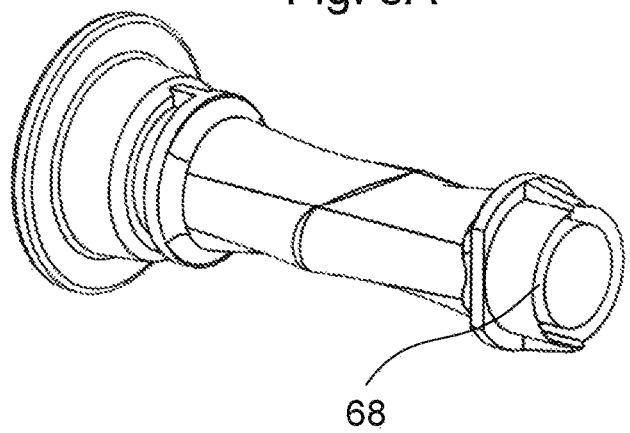
FIGS. 5A and 5B show cross sectional views through the dispense valve shown in FIG. 4.
Figure 5B:
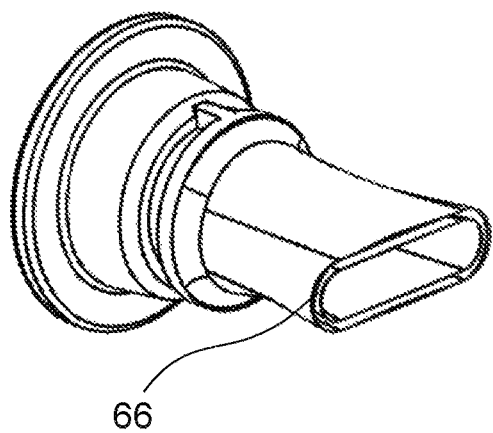

FIG. 4 shows the dispense valve 56 in isolation. The dispense valve 56 has at least a first portion 66 and a second portion 68. FIGS. 5A and 5B show cross sections through the dispense valve 56 at first and second portions 66, 68. As shown, in the first portion 66, the cross section has a different shape to the cross section at the second portion 68. In the first portion 66, the cross section is in the form of a rounded rectangle, whereas in the second portion 68, the cross section is circular. Additionally, the wall thickness in the first portion, is thinner than the wall thickness in the second portion 68. Whilst in the embodiment shown, the region having the reduced wall thickness is aligned with the portion having a different cross section, this is not essential and instead they may be on different portions/regions of the dispense valve 56. Additionally, the reduced wall thickness may only be on parts of the cross section, e.g. on side portions of the cross section, and other parts of the cross section may have the same wall thickness.

The change in wall thickness and cross section, may at least partially define where the valve member 56 kinks as it is bent due to movement of the dispense outlet 18. The use of differing wall thicknesses and cross sections may cause the dispense valve 56 to reliably deform at the same position, in a predictable manner, thereby ensuring that a reliable closing of the dispense valve 56 can be obtained. Also, by controlling the way in which the dispense valve 56 deforms, it may be possible to obtain more control over how the dispense valve 56 deforms over time, and thus ensure longevity of the dispense valve 56.

Figure 6:
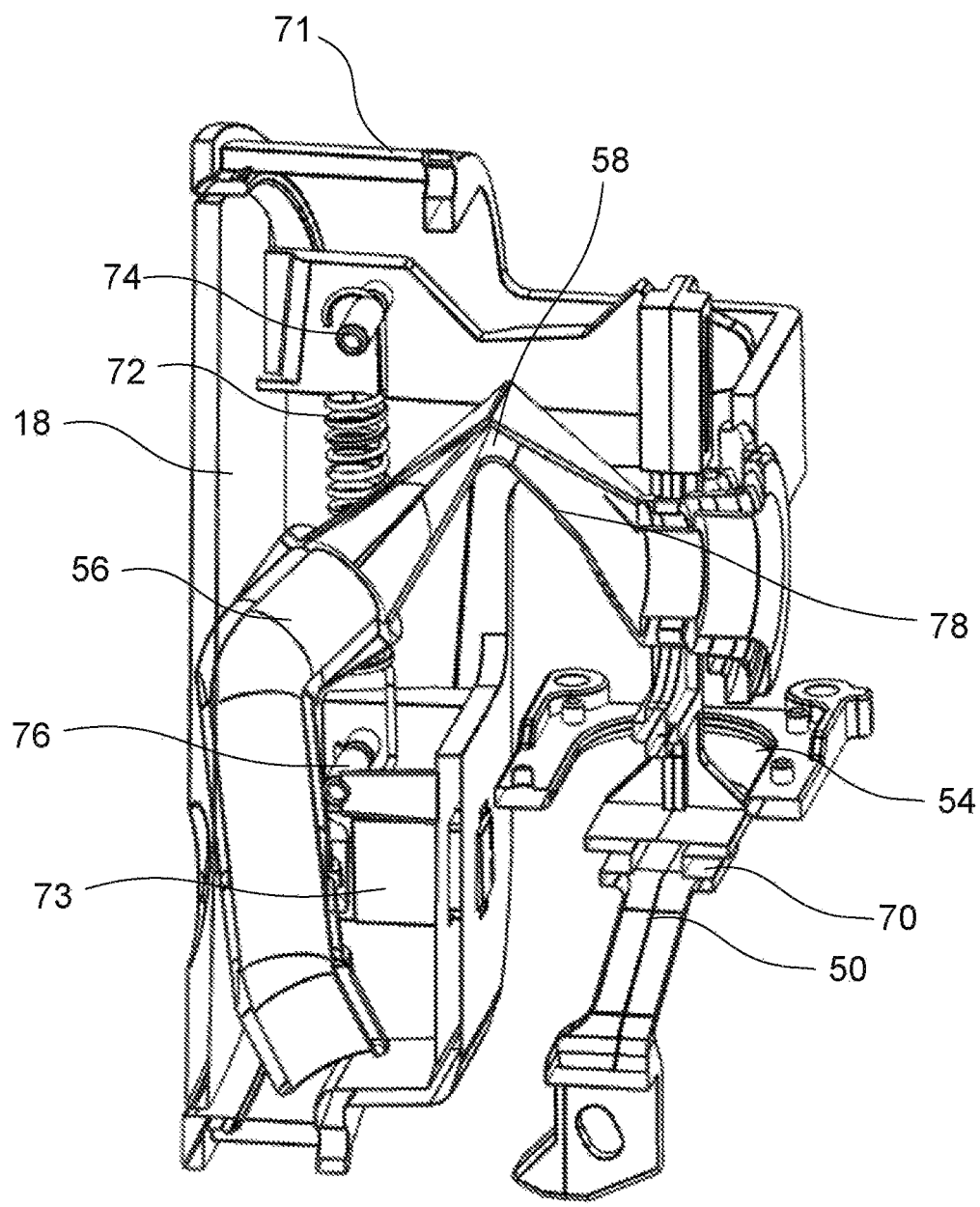
FIG. 6 is a detailed view of the dispense outlet showing the dispense valve in the closed configuration.

FIG. 6 shows a sectional view focusing on the dispense outlet 18 and its associated components. The opening 54 through which the mechanical linkage 50 extends, can be seen more clearly in this Figure. The sealing member 52 shown in earlier Figures has been removed to show the mechanical linkage 50 and its features. As shown, the mechanical linkage 50 comprises a slot 70 into which the second end 51 of the sealing member 52 engages. This slot 70 may help to ensure that the sealing member 52 remains secured to the mechanical linkage 50 even as it is moved throughout its range of movement.

Figure 12:
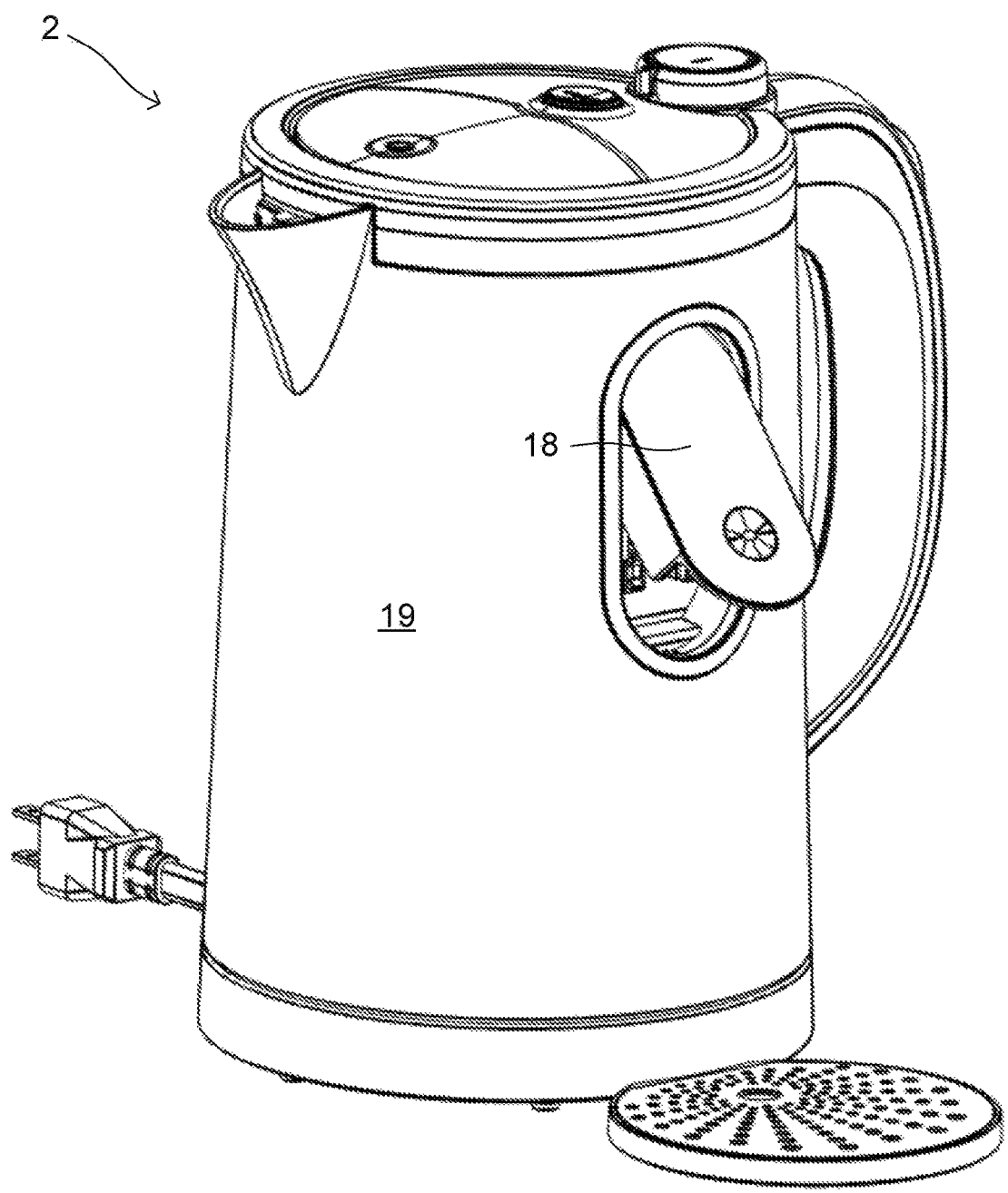
FIG. 12 shows a perspective view of the liquid heating appliance operating in the first mode.

The dispense outlet 18, and its associated components, are contained within a dispense housing 71. The dispense outlet 18 is pivotally mounted to the dispense housing 71 via a pivot 74. A resilient member in the form of a spring 72 is arranged between the pivot and a mount 76 on the dispense outlet 18 itself. The spring 72 acts to bias the dispense outlet 18 towards the dispensing position. The dispense outlet 18 is held in the non-dispensing position by a push catch 73, which must be released before the spring 72 can move the dispense outlet 18 into the dispensing position. The push catch 73 may be released by pushing the dispense outlet 18, e.g. by pressing on the recessed portion 20, in towards the appliance 2. Following release of the push catch 73, the spring 72 will then drive the dispense outlet 18 into the dispensing position, as shown in FIG. 12. The dispense outlet 18 may be pushed back into the non-dispensing position, in which the push catch 73 may reengage the dispense outlet 18 and hold it in the non-dispensing position. The above is just one exemplary embodiment of how the dispense outlet 18 may be arranged in the appliance 2, and any other suitable arrangement may be employed.

As shown more clearly in this enlarged view of the dispense outlet 18, the kink 58 in the dispense valve 56 may form an incline 78 which liquid must pass up and over before it can escape through the dispense valve 56. This incline 78 may have a sufficient height to stop the unwanted flow of liquid through the dispense valve 56 without necessarily fully closing the dispense valve 56.

Figure 7:
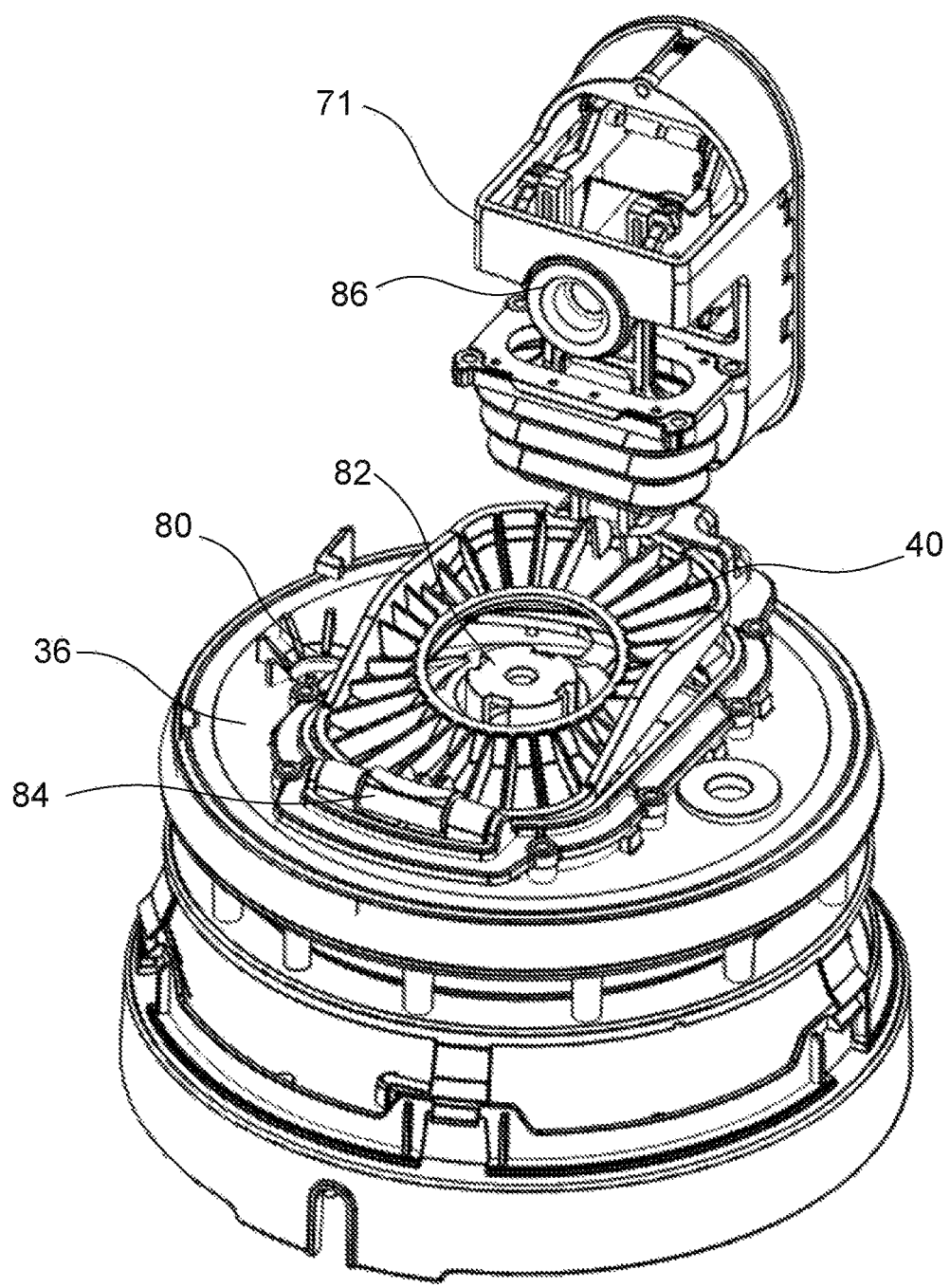
FIG. 7 is a perspective view showing the mode valve, with parts of the appliance removed for clarity.

FIG. 7 shows a view of the inside of the appliance 2, with some of the components removed. The valve member 40 is in the form of a flap valve and is pivotally mounted via pivot 84 to the partition 36. In the center of partition 36 a float valve 82 is arranged. The float valve 82 comprises a floating member arranged to mate with a valve seat when the first chamber 32 is filled with liquid. When the first chamber 32 is drained, the floating member drops within the float valve 82 and liquid can drain from the second chamber 36 to the first chamber 32. Whilst this is not necessary when operating in the second mode as configured in FIG. 7, this float valve 82 allows refilling of the first chamber 32 without having the open the valve member 40 when operating in the first mode, i.e. the hot cup mode. The float valve 82 may therefore permit multiple hot cup operations without the user having to repeatedly operate the dispense outlet 18 to permit liquid to enter the first chamber 32.

An outlet 80 is provided in the partition 36. The connection conduit 46 (not shown in this Figure) is connected to this outlet 80 in order to allow heated liquid to pass into the dispense chamber 44 (not shown in this Figure). The dispense housing 71 comprises an inlet 86 which the dispense valve 56 (not visible in this view) is connected on one side, and to which the conduit 48 (shown in FIG. 3) is connected to on the side visible in this Figure. This provides a fluid connection between the dispense chamber 44 and the dispense valve 56.

Figure 8:
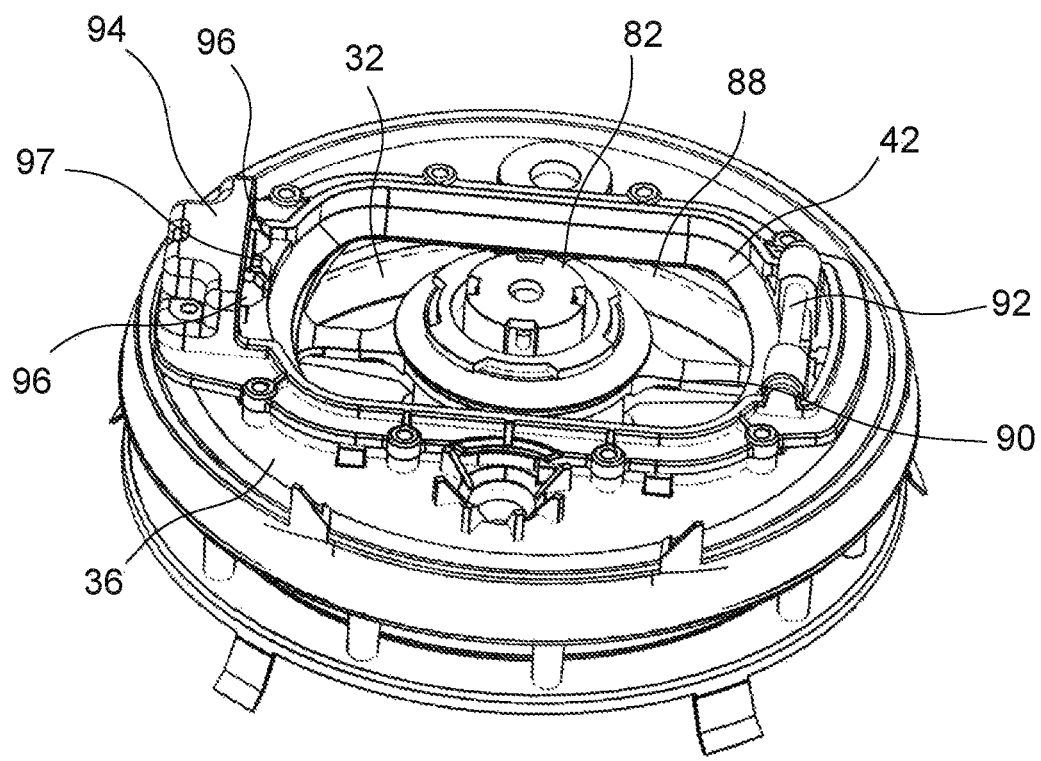
FIG. 8 is a perspective view of the mode valve, with the valve member removed.

FIG. 8 shows a more detailed view focusing on the first chamber 32 and the partition 36. In the view shown in FIG. 8, the valve member 40 has been removed to more clearly show other components. The valve seat 42, to which the valve member 40 engages when in the closed position, defines an opening 88 in the partition 36. This opening 88 permits the flow of fluid between the first and second chambers 32, 34 when operating in the second mode of operation. The float valve 82 is supported in the center of the opening 88 by a plurality of supports 90.

Arranged at one side of the opening 88 is a pivot rod 92 to which the valve member 40 is pivotably mounted. At the opposite end of the opening 88 a latch arrangement 94 is provided. The latch arrangement 94 is configured to hold the valve member 40 in a closed position, and thus hold the mode valve 38 in the closed position, when the appliance operates in the hot cup mode of operation. The latch arrangement comprises release members 96 and a latch member 97. The release member 96 and latch member 97 are be coupled together such that operation of the release members 96 causes release, e.g. retraction, of the latch member 97. The latch arrangement 94 may be configured to be released by movement of the dispense outlet 18 from the dispensing position to the non-dispensing position. For example, the mechanical linkage 50 (not visible in this Figure) may act on the release members 96 to release the latch member 97 thereby allowing the valve member 40 to move into, and out of, the closed position.

As discussed previously, the use of a latch arrangement 84 which holds the mode valve 38 in the closed position may mean that the opening 88 can be larger than it otherwise would be without a latching arrangement 84. The increased size of the opening 88 may help to promote the circulation of fluid between the two chambers 32, 34 in the kettle mode of operation, thus enabling the kettle to function in the most efficient manner.

Figure 9:
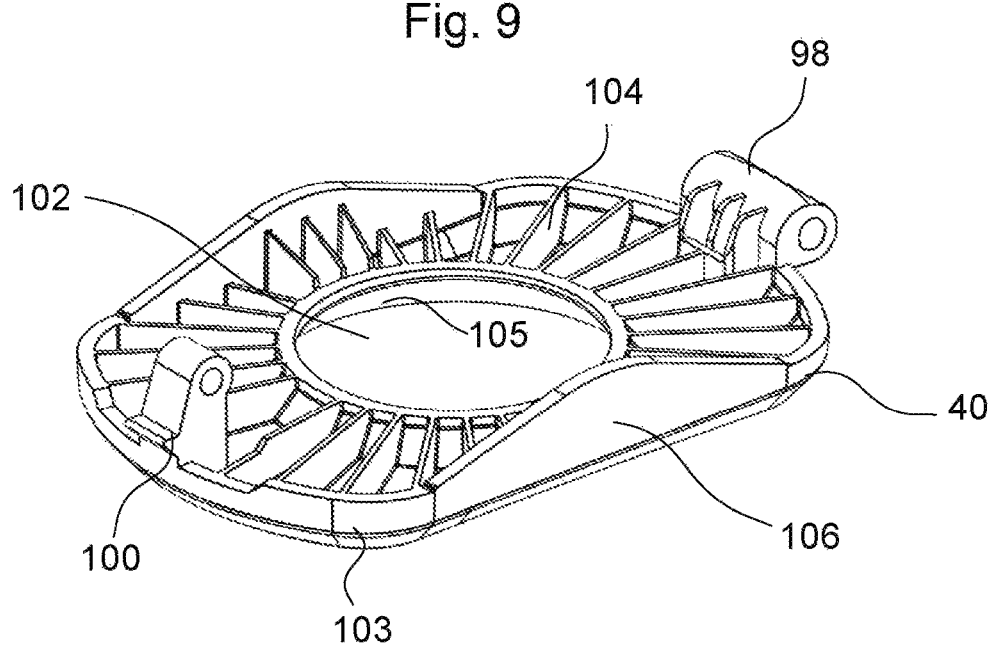
FIG. 9 is a perspective view of the valve member in isolation.

FIG. 9 shows the valve member 40 in isolation. The valve member 40 is ring shaped and defines an opening 102 in its center. The ring shape does not need to be circular, and instead may have any suitable shape. The opening 102 in the center of the valve member 40 accommodates the float valve 82 shown in FIG. 8. The valve member 40 comprises a cylindrical sleeve 98 at one end which enables the valve member 40 to be pivotally mounted to the pivot rod 90 shown in FIG. 8. At the other end of the valve member 40 a latch 100 and linkage engagement means 101 are arranged. The latch 100 is chamfered at its bottom end. This chamfer may help the latch 100 to pass the latch member 97 of the latching arrangement 94 as the valve member 40 is moved into its closed position. The linkage engagement means 101 provides means for connecting the mechanical linkage 50, which is coupled to the dispense outlet 18, to the valve member 40. The mode valve 38 comprising the flap valve 40 and valve seat 42 may be referred to as a flap valve.

The ring-shaped valve member 40 has a u-shaped cross section which defines outer and inner walls 103, 105. A plurality of support fins 104 are arranged between the outer and inner walls 103, 105 and may increase the rigidity of the ring shaped valve member 40. Additionally, portions 106 of the outer walls 103 have an increased height when compared to other portions of the valve member 40. Both the support fins 104 and the portions 106 having increased wall height may increase the rigidity of the valve member 40. This increased rigidity may be particularly important in ensuring that the valve member 40 can provide a sufficiently strong seal, when in the closed position. The portions 106 having an increased height are positioned equidistant between the latch 100 and the cylindrical sleeve 98. These portions 106 are thus provided at the greatest distance from any external support on the valve member 40, i.e. in regions wherein the valve member 40 would otherwise be most likely to deform and release the seal provided.

Figure 10:
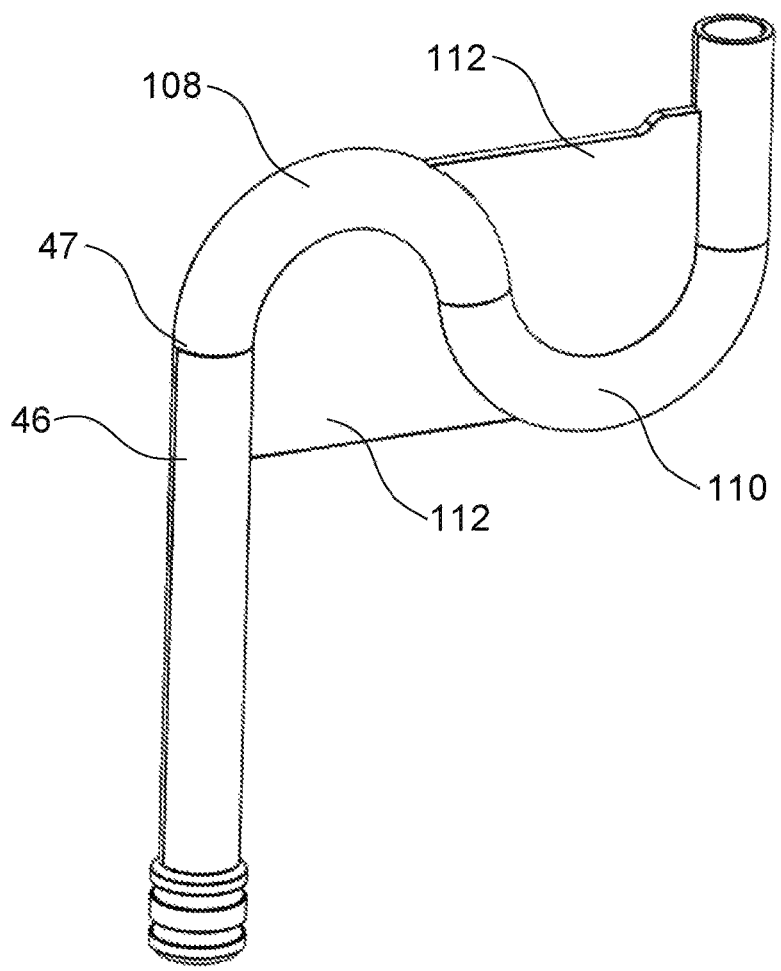
FIG. 10 is a perspective view of the connecting conduit in isolation.

FIG. 10 shows the s-shaped connection conduit 46 in isolation. The s-shape of the connection conduit 46 defines a tortuous path. This tortuous path increases the flow path of fluid between the first chamber 32 and dispense chamber 44, and thus increases the resistance to flow of fluid between these chambers 32, 44. When operating in the kettle mode, as shown in the preceding Figures, despite the lower pressures due to fluid being able to pass into the second chamber 34, there may in some instances be sufficient pressure to drive some fluid towards the dispense chamber 44. The increased resistance to flow provided by the connection conduit 46 may prevent the liquid from being able to reach the dispense chamber 44, which may prevent any fluid from being inadvertently dispensed from the dispense outlet 18.

In the embodiment show, the tortuous path of the connection conduit 46 comprises a first bend 108 and a second bend 110 which define an s-bend. Such an s-bend is particularly well suited to trapping fluid and preventing the undesirable flow of fluid through the connection conduit 46 when the fluid pressure is relatively low. Whilst an s-bend is shown, any other form of bend capable of providing sufficient resistance to flow may be provided. The sections of connection conduit 46 are supported and held fixed with respect to one another by support fins 112. Additionally, the use of the s-bend also allows the connection conduit 46 to connect the outlet 80 on the first chamber 32 with an inlet on the dispense chamber which are off center to one another. At least one of the bends 108, i.e. the peak thereof, may be arranged above a maximum fill level of the appliance, which is shown by line 47.

Figure 11:
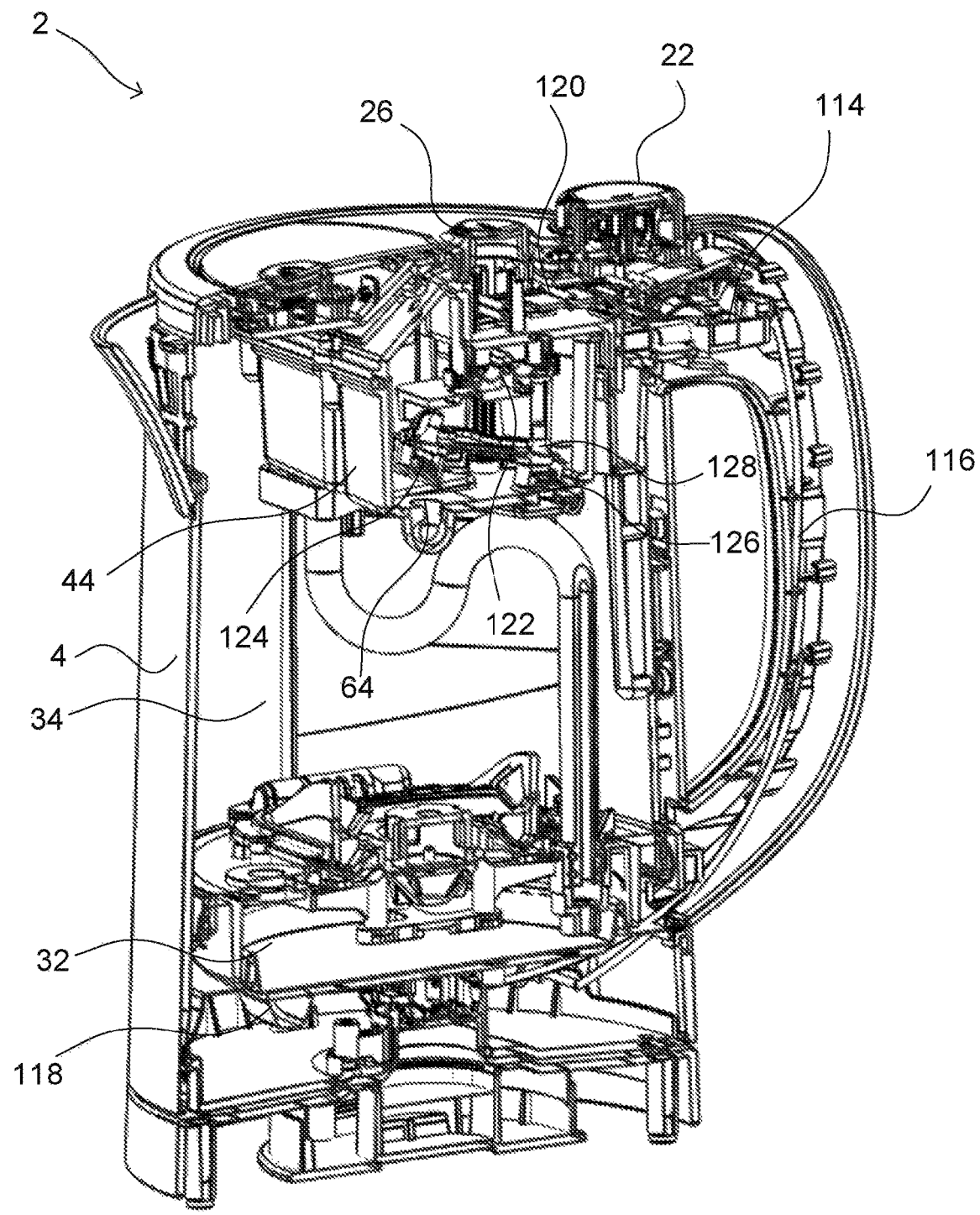
FIG. 11 is a cut-away view through the appliance shown in FIG. 1 showing the components within the dispense chamber.

FIG. 11 shows a cross section through the appliance 2 and particularly focusses on the dispense chamber 44 and the components arranged therein. As mentioned previously, the dispense chamber 44 comprise an outlet 64, i.e. a first outlet, from which liquid may travel towards the dispense outlet 18 (not shown in this Figure). The dispense chamber 44 also comprises a drain outlet 126, i.e. a second outlet, which in certain instances may be used to permit the draining of liquid from the dispense chamber 44 into the second chamber 34.

The "STOP" button 26 is coupled via a coupling 122 to a valve element comprising a stop valve member 124 and a drain valve member 128. During operation of the appliance 2, e.g. in the kettle mode as shown, the drain valve member 128 is held against the drain outlet 126. As a result no liquid can drain from the dispense chamber 44. Additionally, the stop valve member 124 is held away from the outlet 64. However, when the appliance 2 is operating in the kettle mode as shown, there should nonetheless be minimal or no liquid in the dispense chamber 44, and so no liquid should escape via the outlet 64. Operation of the "STOP" button will be described in more detail later with respect to FIG. 17.

The appliance 2 comprises a heating arrangement in the form of an underfloor heating arrangement 118 arranged to heat the base of the first chamber 32. The underfloor heating arrangement 118 may be the only heating arrangement in the appliance 2. The underfloor heating arrangement 118 is electrically connected via cables 116 to a thermomechanical switching arrangement 114 arranged at the top of the liquid reservoir 4. The thermomechanical switching arrangement 114 may comprise the Applicant's popular R48 series steam switch. The thermomechanical switching arrangement 114 is coupled to the "ON" switch and is arranged so as to be sensitive to the temperature within the appliance 2. The switching arrangement 114 may be sensitive to both the temperature in the second chamber 34 as well as the temperature in the dispensing chamber 44. When a predetermined temperature is reached, the thermomechanical switching arrangement 114 switches off the power supply to the underfloor hearing arrangement 118, e.g. when a thermomechanical element arranged within the thermomechanical switching arrangement 114 detects a predefined temperature.

The thermomechanical switching arrangement 114 is arranged in an upper portion of the second chamber 34. The dispense chamber 44 may comprise an opening (not visible in this Figure) which allows steam to escape the dispense chamber 44 and trigger the thermomechanical switching arrangement 114, when the appliance is operating in the first mode of operation. Further, a shutter (not visible in this Figure), which allows for selective closing of the opening in the dispense chamber 44, may be coupled to the thermomechanical switching arrangement 114. Accordingly, when the thermomechanical switching arrangement 114 turns off the power supply to the underfloor heating arrangement 118, the shutter may be closed such that steam can no longer escape from the dispense chamber 44. This may allow the thermomechanical switching arrangement to reset more quickly when operating in the first mode of operation.

The "STOP" button 26 is also coupled to the thermomechanical switching arrangement 114 by a coupling 120 such that operation of the "STOP" button 26 also operates the thermomechanical switching arrangement 114 to turn off the power supply to the heating arrangement 118.

Operation of the appliance 2 in the kettle mode will now be described with reference to FIGS. 1-11. When the dispense outlet 18 is moved into the non-dispensing position, the mechanical coupling provided by the mechanical linkage 50 moves the valve member 40 into an open position such that the mode valve 38 is open. Relatively free movement of the mechanical linkage 50 is permitted due to the sealing member 52 having the bellowed structure. With the dispense outlet 18 in the non-dispensing position, the dispense valve 56 is also closed such that no liquid can escape through the dispense outlet 18. Of course the dispense outlet 18 may already be in the non-dispensing position, for example due to a previous use of the appliance in the kettle mode. The mechanical coupling of the dispense outlet 18 to the mode valve 38 therefore controls the operational mode of the appliance 2.

The user may then press the "ON" button 22 such that the heating arrangement 118 is powered ON. Liquid, e.g. water, contained within the liquid reservoir 4 will then begin to be heated. Specifically, the underfloor heating arrangement 118 will heat liquid contained within the first chamber 32. As the liquid is heated in the first chamber 32, convection currents will form and the heated liquid will circulate, through the opening 88 in the partition, into the second chamber 34. Eventually, once the liquid within the liquid reservoir 4 reaches a predetermined temperature, the thermomechanical switching arrangement 114 will be triggered, e.g. due to the formation of sufficient steam in the liquid reservoir 4, and cut off the power supply to the heating arrangement 118. The liquid reservoir 4 may then be lifted away from the power base 6 and the heated liquid may be dispensed through the spout 12.

Due to the connecting conduit 46 defining a tortuous path, the heated liquid will not be able to travel into the dispensing chamber 44 in this kettle mode of operation. Additionally, due to the dispense valve 56 been closed when operating in this mode, no liquid can be dispensed out through the dispense outlet 18, even if any liquid were to be present in the dispense chamber 44 or any interconnecting conduits.

FIGS. 12-17 illustrate the appliance 2 operating in the first mode of operation, i.e. the hot-cup mode. FIG. 12 illustrates the appliance 2 configured in the hot-cup mode in which the dispense outlet 18 has been moved into the dispensing position. As shown in this Figure, the dispensing position in this embodiment corresponds to the dispense outlet 18 protruding out from the wall 19 of the appliance 2.

Figure 13:
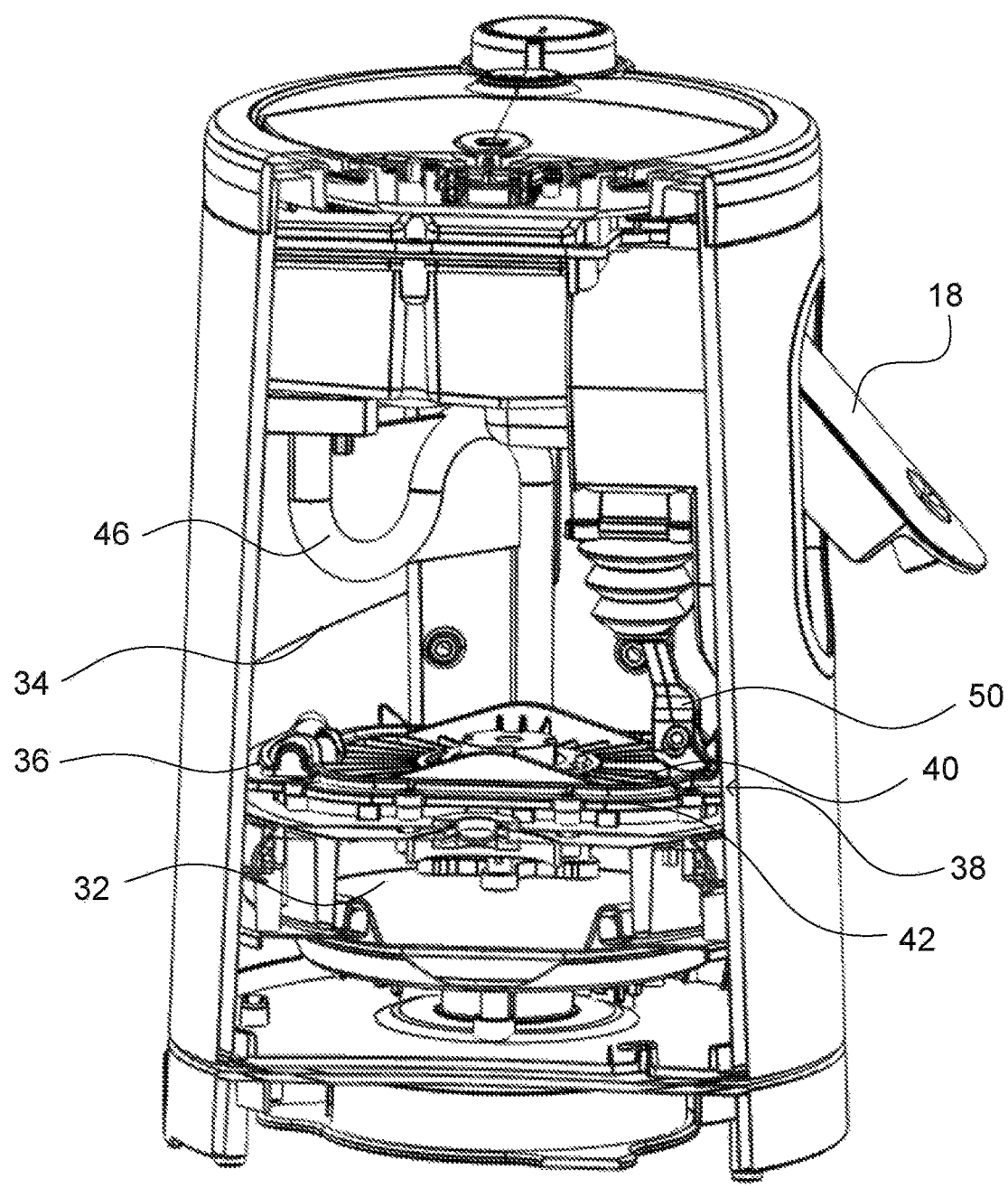
FIG. 13 is a cut-away view of the appliance shown in FIG. 12.

FIG. 13 shows a cut-away view of the appliance 2 operating in the hot-cup mode. With the dispense outlet 18 moved into the dispensing position as shown the mechanical linkage 50 drives the mode valve 38 closed. In this position, the valve member 40 is engaged with and sealed against the valve seat 38. This therefore closes the partition 36 separating the first and second chamber 32, 34 and thus closes the opening 88 (not visible in this Figure). As a result, when the liquid is heated in the first chamber 32 it cannot circulate into the second chamber 34 via the mode valve 38, and instead is forced under pressure through the connecting conduit 46.

Figure 14:
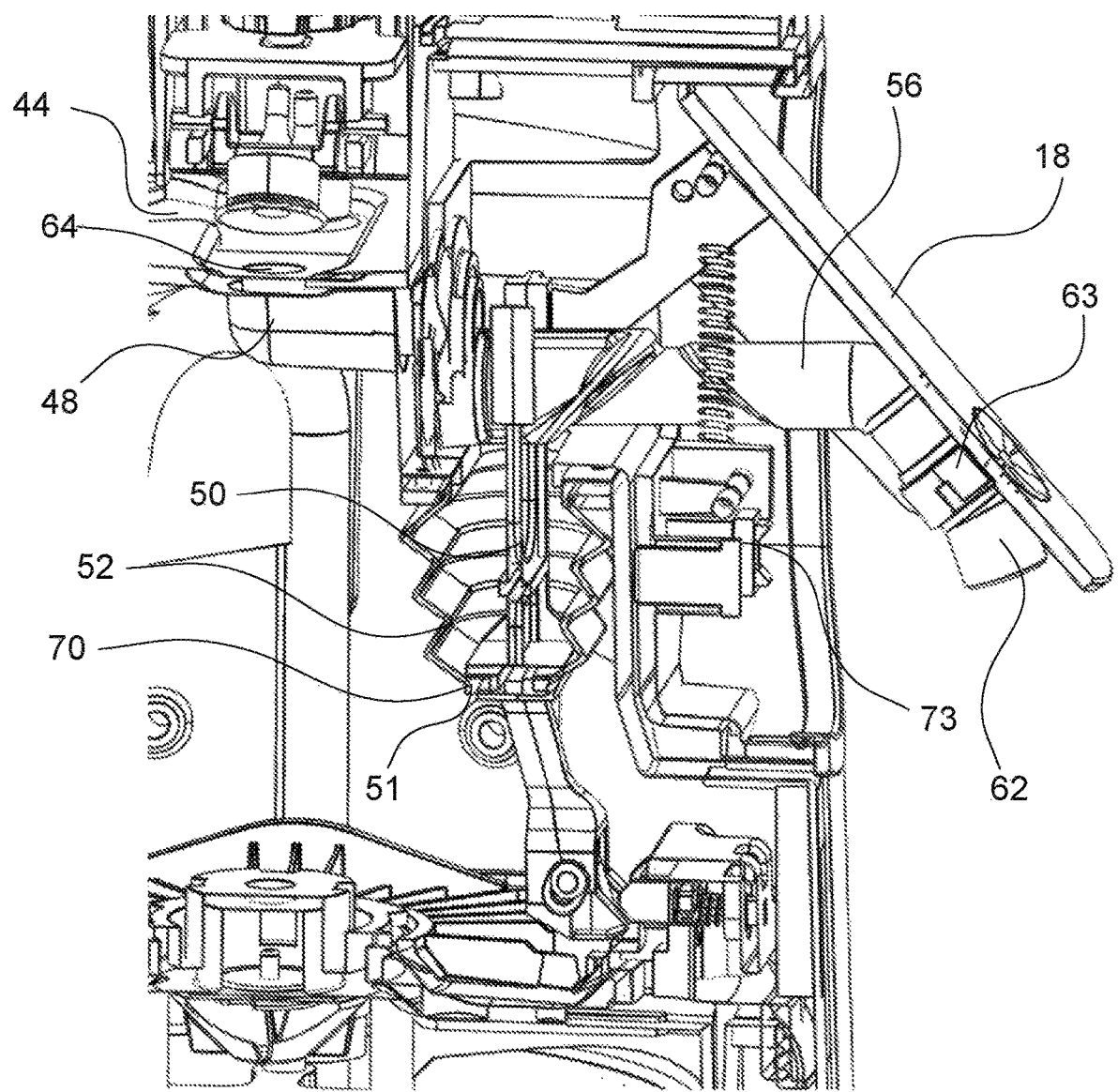
FIG. 14 is a cut-away view focusing of the appliance shown in FIG. 12, focusing on the dispense outlet.

FIG. 14 shows a cut-away view through the appliance 2 and focusses on the dispense outlet 18. When the dispense outlet 18 is moved into the dispensing position, the dispense valve 56 is moved into an open configuration in which liquid can pass through the dispense valve and leave the dispense outlet 18 via the second end 62. Liquid which fills the dispense chamber 44 may thus drain out of the outlet 64, through the conduit 48 and out through the dispense outlet 18 through the second end 62 of the dispense valve 56. This Figure also more clearly shows the collar 63, on the dispense outlet 18, which holds the dispense valve 56 in place in the dispense outlet 18. This Figure also demonstrates how the sealing member 52, having a bellowed structure engages with the slot 70 in the mechanical linkage 50. The second end 51 is engaged with, and sealed around, the slot 70 on the mechanical linkage 50. The push catch 73, which secures the dispense outlet in the non-dispensing position shown in FIG. 1, is shown more clearly in this Figure.

Figure 15:
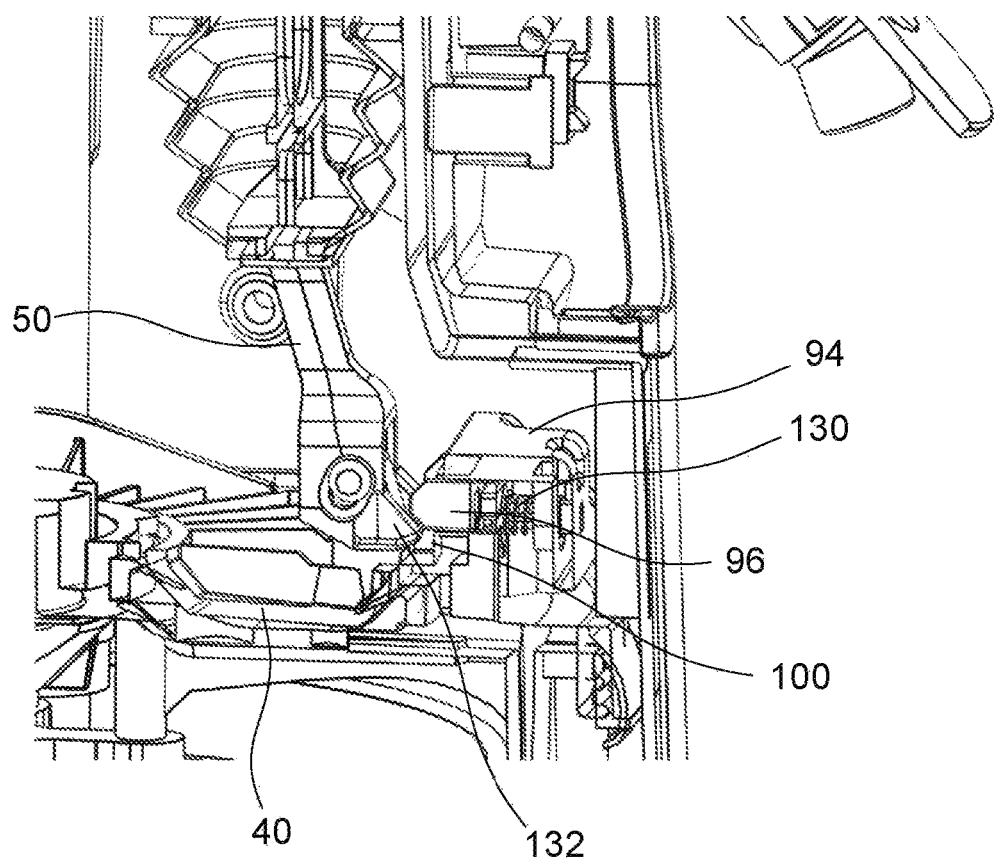
FIG. 15 is a cut-away view focusing on the valve member and its interaction with the latching arrangement.

FIG. 15 shows a cut-away view focusing on the latching arrangement 94. With the valve member 40 in the closed position, the latching member 97 (not visible in this Figure) latches onto the latch 100 on the valve member 40. The latching arrangement 94 comprises a resilient member in the form of a spring 130. The spring 130 is arranged to bias the latching member 97 into a latching position, i.e. a position in which it latches the latch 100 to hold the valve member 40 in the closed position. The mechanical linkage 50 comprises actuating portions 132 at its lower end. The actuating portions 132 comprises chamfered edges for engagement with the release member 96 of the latching arrangement 94. When the mechanical linkage 50 is driven downwards towards the latching arrangement 94, the actuation portions 132 act on the release member 96 to retract the latch member 97 against the bias of the spring 96, and thereby allow the valve member 40 to be moved into the closed position. Once in the closed position, the actuation portions 132 pass the release members 96 and the spring 130 drives the latch member 97 so as to protrude from the latch assembly 94 to hold the valve member 40 in the closed position.

When the dispense outlet 18 is moved back into the non-dispensing position, i.e. out of the position shown in FIG. 15 and into the position shown in FIG. 1, the actuation portions 132 act on the release members 96 as the mechanical linkage 50 is lifted upwards. This retracts the latch member 97 and allows the mechanical linkage 50, and linked valve member 40, to move upwards and thus open the mode valve 38. Once past the release member 96, the latch member 97 may once again move into a protruding position under the bias of the spring 96.

Figure 16:
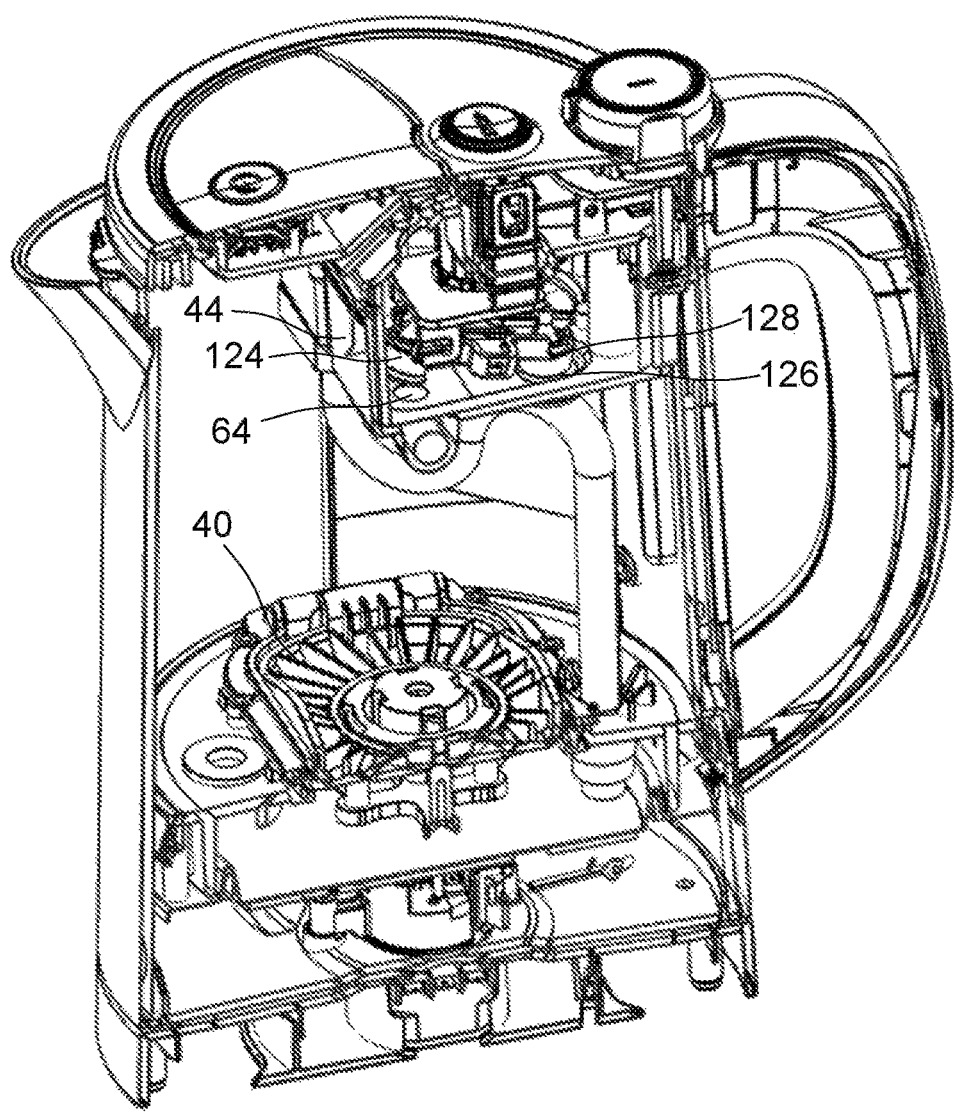
FIG. 16 is a cut-away view showing the configuration of the components within the dispense chamber when the appliance is operating to heat liquid in the first mode of operation.

FIG. 16 shows a cut-away view of the appliance 2 configured in the hot-cup mode of operation, i.e. with the valve member 40 in the closed position. In this configuration, during normal operation, the drain valve 126 is closed by the drain valve member 128 and the outlet 64 is open, due to the stop valve member being held away from the outlet 64. Accordingly, when liquid reaches the dispense chamber 44, it will be free to drain out the dispense chamber 44 towards the dispense outlet 18, via the outlet 64.

Figure 17:
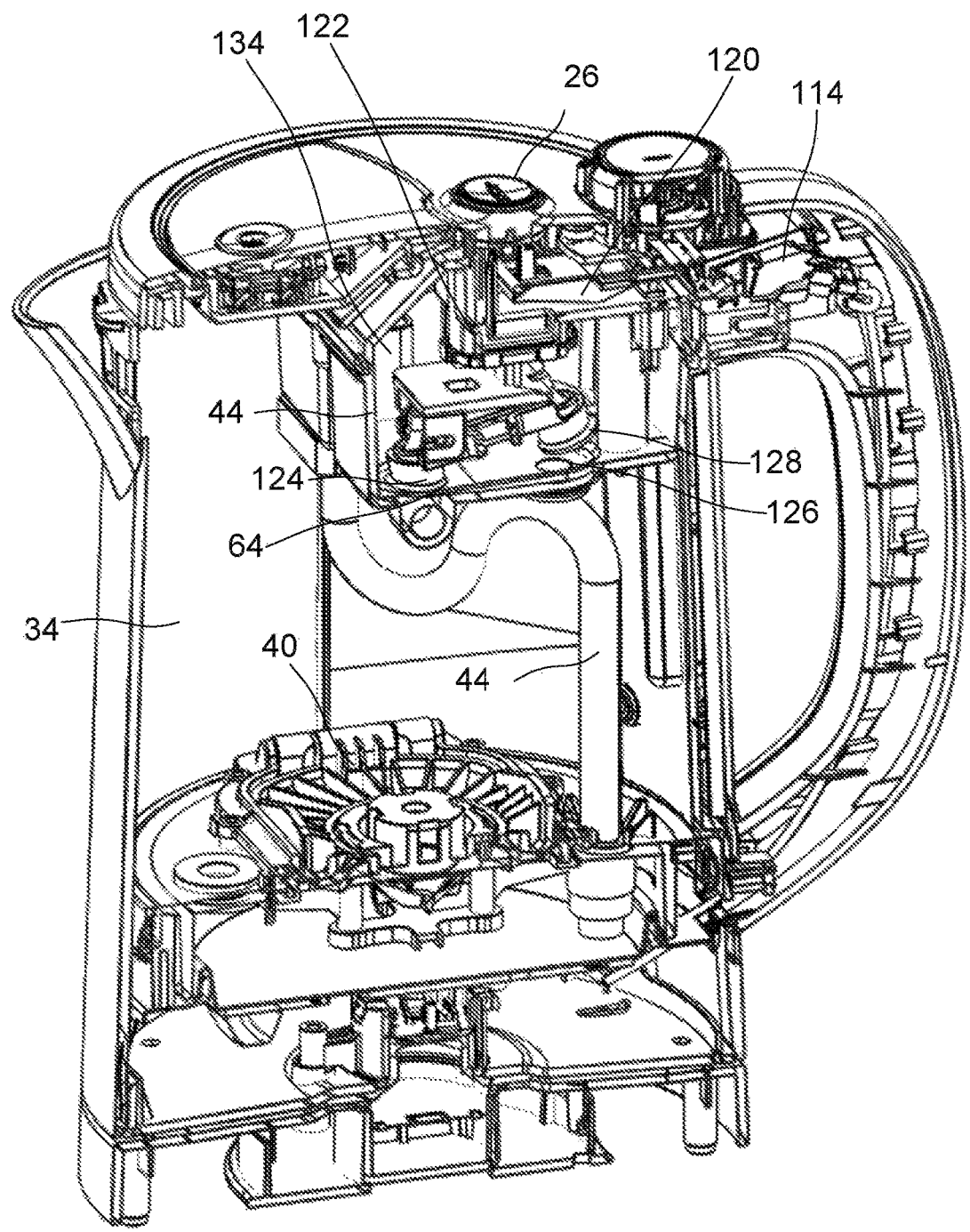
FIG. 17 is a cut-away view showing the configuration of the components within the dispense chamber when the appliance is stopped mid-operation.

FIG. 17 shows a cut-away view of the appliance 2 configured in the hot-cup mode and wherein the "STOP" button 26 has been operated. As described previously with respect to FIG. 11, the "OFF" button 26 is coupled to the thermomechanical switch arrangement 114 via the coupling 120 and is also coupled to the valve members 124, 126 via the coupling 126. When the "STOP" button has been operated, the valve member 124 is moved to close the outlet 64 and the drain valve member 128 is moved to open the drain outlet 126. This allows any liquid remaining in the dispensing chamber 44 to drain back into the second chamber 34 and also prevents any further liquid dispensing from the dispense chamber 44 to the dispense outlet 18 as the outlet 64 is closed. Further, the coupling 120 causes the switch arrangement to cut the power to the heating arrangement 118 such that the liquid within the first chamber 32 is no longer heated.

The dispense chamber 44 may also comprise a weir 134 over which liquid must pass before being able to leave the dispense chamber 44, either through the outlet 64 during a dispensing operation. The weir 134 may help to ensure that any liquid within the connecting conduit 46, e.g. any liquid trapped in the s-bend portion thereof, which was not dispensed in a previous operation, is mixed with freshly heated liquid. This may help to ensure that there is no initial cold, or insufficiently heated, portion of water which is dispensed from the dispensing chamber 44.

Operation of the appliance 2 in the first mode, i.e. the hot-cup mode, will now be described with reference to FIGS. 12-17. When the dispense outlet 18 is moved into the dispensing position, as shown in FIG. 12, the mechanical coupling, via the mechanical linkage 50, of the dispense outlet 18 to the mode valve 38, causes the mode valve 38 to move into the closed position. As the dispense outlet 18 is moved into the dispensing position, the mechanical linkage will release the latching arrangement 94, as described in detail above, and drive the valve member 40 into engagement with the valve seat 38 thereby putting the mode valve 38 in the closed configuration. As the valve member 40 is moved into, or as it reaches, the closed position, the latching arrangement 94 acts to latch and hold the valve member 40 in the closed position. The mechanical coupling of the dispense outlet 18 to the mode valve 38, therefore conveniently acts to control the operation of the appliance 2.

In addition to closing the mode valve 38, as the dispense outlet 18 is moved out into the dispensing position, movement of the dispense outlet 18 may also cause the dispense valve 56 to be moved into an open configuration in which liquid can pass through the dispense valve 56 substantially unimpeded. This therefore opens the dispense valve 56 such that liquid can be dispensed from the dispense outlet 18.

Accordingly, with the dispense outlet 18 in the dispensing position, the mode valve 38 is closed and the dispensing valve 56 is opened. When the "ON" button 22 is subsequently pressed, the liquid heating arrangement 118 will be supplied with power and the liquid contained within the first chamber 32 will be heated. As the temperature of the liquid increases, the pressure in the first chamber 32 will increase, and heated liquid will be forced under steam pressure through the connecting conduit 46. The first chamber 32 may be dimensioned, and the heating arrangement 118 will be configured, such that it is possible to achieve pressures within the first chamber that are sufficient to overcome the resistance of the tortuous flow path provided by the connecting conduit 46. The heated liquid will therefore be forced through the connecting conduit 46 to the dispensing chamber 44.

Once in the dispensing chamber 44, the heated liquid will then be able to flow out of the dispensing chamber through the outlet 64, out through the conduit 48, through the open dispensing valve 56 and thus out the dispense outlet 18. The heated liquid may fall into a receptacle which is arranged on the drip tray 30. This process will continue until the liquid in the first chamber 32 has been heated sufficiently to trigger the thermomechanical switching arrangement 114. The thermomechanical switching arrangement 114 may be configured such that it does not switch off power to the heating arrangement 118 until a predetermined volume of liquid has been dispensed. This may be achieved by appropriate tuning of the predetermined temperature at which the thermomechanical switching arrangement 114 operates. Triggering of the thermomechanical switching arrangement 114 may be achieved through steam escaping the dispense chamber 44 via an opening (not visible on this Figure), so that it can pass over the thermomechanical switching arrangement 114.

Repeat operations of the appliance 2 in the hot-cup mode, without opening of the mode valve 38, are facilitated through the float valve 82 which permits the refilling of the first chamber 32. At the end of a dispensing operation in the hot-cup mode, when the liquid has been drained from the first chamber 32 and when the pressure therein has dropped, the floating member in the float valve 82 will drop, and liquid from the second chamber 34 will flow through the float valve 82 into the first chamber 32. Once filled, the floating member in the float valve 82 will act to close the float valve 82 and prevent the flow of liquid from the second chamber 34 to the first chamber 32.

If a user decides midway through a hot-cup dispensing operation that they wish to stop the process, e.g. because they are about to overfill their receptacle, they may press the "STOP" button 26. Pressing of the "STOP" button 26 as described in detail with respect to FIG. 17 causes the coupling 120 to act on the switch arrangement 114 to turn off the power to the heating arrangement 118, thereby stopping the heating of the liquid in the first chamber 32. This will act to stop the flow of any further liquid from the first chamber 32 to the dispensing chamber 34. Additionally, the coupling 122 will move the drain valve member 128 away from the drain outlet 126 and move the valve member 124 to close the outlet 64. Accordingly, following operation of the "STOP" button 26, liquid from the dispense chamber 44 can no longer be dispensed via the dispense outlet 44, due to the closing of outlet 64, and instead the liquid is able to drain into the second chamber 34 via the drain outlet. This therefore acts to stop any further dispensing of liquid from the dispense outlet 18.

What is claimed is:

1. A liquid heating appliance comprising:
    a liquid reservoir comprising a first chamber arranged below a second chamber and separated by a partition extending therebetween;
    a heating arrangement arranged to heat, in use, liquid contained within the first chamber;
    a mode valve arranged in the partition to selectively allow liquid to flow between the first and second chambers, wherein the appliance is arranged to be operable in a first mode in which the mode valve is closed and only liquid in the first chamber is heated and a second mode in which the mode valve is open and liquid in the first and second chambers is heated by the heating arrangement;
    a dispense outlet arranged on an exterior wall of the appliance and moveable between a dispensing position in which it is in fluid communication with the first chamber so as to allow liquid to be dispensed from the first chamber during the first mode, and a non-dispensing position in which liquid cannot be dispensed and wherein a fluid flow path arranged between the first chamber and dispense outlet, wherein the flow path comprises a dispense valve configured to have at least an open configuration in which liquid can pass through the dispense valve and a closed configuration in which liquid is inhibited from flowing through the dispense valve, and wherein the dispense outlet is coupled to the dispense valve such that when in the dispensing position, the dispense valve has the open configuration, and when in the non-dispensing position, the dispense valve has the closed configuration.

2. The liquid heating appliance of claim 1, further comprising a dispense chamber arranged in a fluid flow path between the first chamber and the dispense outlet such that liquid first passes via the dispense chamber before passing out of the dispense outlet.

3. The liquid heating appliance of claim 2, further comprising a fluid connection conduit connecting the first chamber to the dispense chamber, and wherein the connection conduit follows a tortuous path.

4. The liquid heating appliance of claim 3, wherein the tortuous path comprises at least first and second bends arranged to define an s-bend.

5. The liquid heating appliance of claim 4, wherein the liquid heating appliance has an intended maximum fill level, and wherein at least one bend in the tortuous flow path is arranged above the maximum fill level.

6. The liquid heating appliance of claim 1, wherein the dispense outlet is mechanically coupled to the mode valve such that when the dispense outlet is moved into the dispensing position, the mechanical coupling clones the mode valve and when the dispense outlet is moved into the non-dispensing position, the mechanical coupling opens the mode valve, and wherein the mechanical coupling comprises a mechanical linkage which extends through an opening in a wall which at least partially defines the second chamber, wherein the appliance further comprises a sealing member extending around the mechanical linkage, wherein a first portion of the sealing member is sealed around the opening and second portion of the sealing member is sealed to the mechanical linkage, and wherein the sealing member is configured such that the second portion of the sealing member can be moved relative to the first portion of the sealing member.

7. The liquid heating appliance of claim 6, wherein the sealing member comprises a bellowed structure configured to permit movement of the second portion relative to the first portion.

8. The liquid heating appliance of claim 6, wherein the mechanical linkage comprises a slot into which the second portion of the sealing member engages.

9. The liquid heating appliance of claim 1, further comprising a latch arrangement configured to hold the mode valve in the closed position.

10. The liquid heating appliance of claim 9, wherein the latch arrangement is configured to be released by movement of the dispense outlet from the dispensing position to the non-dispensing position.

11. The liquid heating appliance of claim 9, wherein the dispense outlet is mechanically coupled to the mode valve such that when the dispense outlet is moved into the dispensing position, the mechanical coupling closes the mode valve and when the dispense outlet is moved into the non-dispensing position, the mechanical coupling opens the mode valve, and wherein the latch arrangement is configured to be released by the mechanical coupling.

12. The liquid heating appliance of claim 1, wherein the mode valve comprises a flap valve.

13. The liquid heating appliance of claim 12, wherein the flap valve comprises a valve member pivoted at a pivot point and arranged to mate with a respective valve seat in the partition to thereby close the flap valve and prevent the flow of liquid therethrough.

14. The liquid heating appliance of claim 13, wherein valve member is ring shaped valve member and has a u-shaped cross section.

15. The liquid heating appliance as claimed in claim 1, wherein the heating arrangement arranged to heat liquid in the first chamber is the only heating arrangement in the liquid heating appliance.

16. The liquid heating appliance of claim 1, wherein the dispense valve comprises a length of deformable conduit in the flow path and configured such that in the closed position the conduit is deformed to prevent the flow of liquid therethrough.

17. The liquid heating appliance of claim 16, wherein the conduit comprises a region having a reduced wall thickness.

18. The liquid heating appliance of claim 16, wherein the conduit comprises at least a first portion having a first cross-section and a second portion having a second, different, cross section.

19. The liquid heating appliance of claim 16, wherein the conduit is formed from silicone.

20. A liquid heating appliance comprising:
a liquid reservoir comprising a first chamber arranged below a second chamber and separated by a partition extending therebetween;
a heating arrangement arranged to heat, in use, liquid contained within the first chamber;
a mode valve arranged in the partition to selectively allow liquid to flow between the first chamber and the second chamber, wherein the appliance is arranged to be operable in a first mode in which the mode valve is closed and only liquid in the first chamber is heated and a second mode in which the mode valve is open and liquid in the first chamber and liquid in the second chamber is heated by the heating arrangement;
a dispense outlet arranged on an exterior wall of the appliance and moveable between a dispensing position in which it is in fluid communication with the first chamber so as to allow liquid to be dispensed from the first chamber during the first mode, and a non-dispensing position in which liquid cannot be dispensed;
a dispense chamber arranged in a fluid flow path between the first chamber and the dispense outlet such that liquid first passes via the dispense chamber before passing out of the dispense outlet; and
a fluid connection conduit connecting the first chamber to the dispense chamber, wherein the connection conduit follows a tortuous path that comprises at least a first bend and a second bend arranged to define an s-bend.

21. A liquid heating appliance comprising:
a liquid reservoir comprising a first chamber arranged below a second chamber and separated by a partition extending therebetween,
a heating arrangement arranged to heat, in use, liquid contained within the first chamber;
a mode valve arranged in the partition to selectively allow liquid to flow between the first chamber and the second chamber, wherein the appliance is arranged to be operable in a first mode in which the mode valve is closed and only liquid in the first chamber is heated and a second mode in which the mode valve is open and liquid in the first chamber and liquid in the second chamber is heated by the heating arrangement;
a dispense outlet arranged on an exterior wall of the appliance and moveable between a dispensing position in which it is in fluid communication with the first chamber so as to allow liquid to be dispensed from the first chamber during the first mode, and a non-dispensing position in which liquid cannot be dispensed;
wherein the mode valve comprises a flap valve comprising a valve member pivoted at a pivot point and arranged to mate with a respective valve seat in the partition to thereby close the flap valve and prevent the flow of liquid therethrough;
wherein the valve member is a ring shaped valve member and has a u-shaped cross section.

* * * * *